(12) United States Patent
Tanaka et al.

(10) Patent No.: US 11,402,585 B2
(45) Date of Patent: Aug. 2, 2022

(54) OPTICAL CONNECTION STRUCTURE

(71) Applicant: SUMITOMO ELECTRIC INDUSTRIES, LTD., Osaka (JP)

(72) Inventors: Masato Tanaka, Osaka (JP); Hidehisa Tazawa, Osaka (JP); Osamu Shimakawa, Osaka (JP); Takafumi Ohtsuka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 379 days.

(21) Appl. No.: 16/804,566

(22) Filed: Feb. 28, 2020

(65) Prior Publication Data

US 2020/0284988 A1 Sep. 10, 2020

(30) Foreign Application Priority Data

Mar. 5, 2019 (JP) .............................. JP2019-039577

(51) Int. Cl.
*H01S 3/00* (2006.01)
*G02B 6/32* (2006.01)
*H01S 3/067* (2006.01)
*H01S 3/091* (2006.01)

(52) U.S. Cl.
CPC .......... *G02B 6/327* (2013.01); *H01S 3/06737* (2013.01); *H01S 3/091* (2013.01)

(58) Field of Classification Search
None
See application file for complete search history.

(56) References Cited

U.S. PATENT DOCUMENTS

2003/0128437 A1* 7/2003 Sato .......................... G02B 6/32
385/33
2005/0063643 A1* 3/2005 Watanabe ............... G02B 6/327
385/33

FOREIGN PATENT DOCUMENTS

| JP | 2014-052496 A | 3/2014 | |
|---|---|---|---|
| JP | 2016-109887 A | 6/2016 | |
| WO | WO 2013031836 A1 * | 3/2013 | ............... G02B 6/32 |
| WO | 2014/038514 A1 | 3/2014 | |

* cited by examiner

*Primary Examiner* — Mark Hellner
(74) *Attorney, Agent, or Firm* — Oliff PLC

(57) ABSTRACT

An optical connection structure includes a first spatial multiplex transmission line, a second spatial multiplex transmission line, a first lens arrangement, a second lens arrangement and a first beam diameter conversion portion. The first spatial multiplex transmission line has a plurality of first transmission lines. The second spatial multiplex transmission line has a plurality of second transmission lines. The first lens arrangement is optically coupled with the first spatial multiplex transmission line. The second lens arrangement is optically coupled with the second spatial multiplex transmission line. The first beam diameter conversion portion has a first end face and a second end face and arranged between the first spatial multiplex transmission line and the first lens arrangement. The first beam diameter conversion portion is configured such that an optical diameter at the second end face is larger than an optical diameter at the first end face.

19 Claims, 16 Drawing Sheets

OPTICAL CONNECTION STRUCTURE

CROSS REFERENCE

The present application is based upon and claims the benefit of the priority from Japanese patent application No. JP2019-039577, filed on Mar. 5, 2019, which is hereby incorporated by reference in its entirety.

TECHNICAL FIELD

The present disclosure relates to an optical connection structure.

BACKGROUND

JP2014-52496 A discloses an optical connector in which multicore fibers (hereinafter, it is also abbreviated as "MCF") are mutually connected using a pair of single lenses. W02014/038514 A1 discloses an optical connector in which a MCF and a plurality of single mode fibers (hereinafter, it is also abbreviated as "SMF") are connected using a single lens and a prism. JP2016-109887A discloses an optical connector which connects a MCF and a plurality of SMFs using a pair of single lenses, wherein end faces of the MCF and the plurality of SMFs are obliquely polished and an anti-reflection coating is provided.

SUMMARY

An optical connection structure according to one embodiment of the present disclosure includes a first spatial multiplex transmission line, a second spatial multiplex transmission line, a first lens arrangement, a second lens arrangement and a first beam diameter conversion portion. The first spatial multiplex transmission line has a plurality of first transmission lines. The second spatial multiplex transmission line has a plurality of second transmission lines. The first lens arrangement is optically coupled with the first spatial multiplex transmission line. The second lens arrangement is optically coupled with the second spatial multiplex transmission line. The first beam diameter conversion portion has a first end face and a second end face and arranged between the first spatial multiplex transmission line and the first lens arrangement. The first lens arrangement and the second lens arrangement are mutually optically coupled to propagate parallel lights between the first lens arrangement and the second lens arrangement. The first end face is in contact with the first spatial multiplex transmission line. The second end face is inclined with respect to a surface perpendicular to a center axis of each of the plurality of first transmission lines. The first beam diameter conversion portion is configured such that an optical diameter at the second end face is larger than an optical diameter at the first end face.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
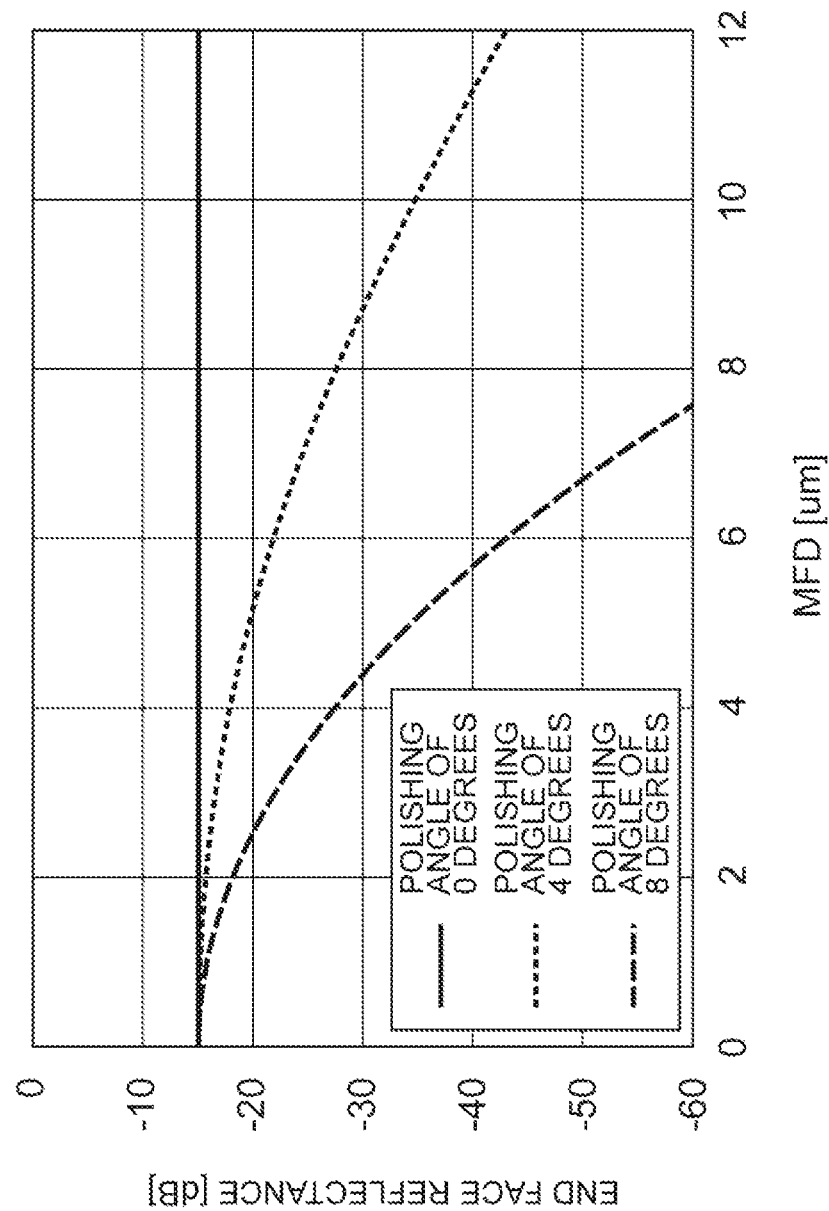
FIG. 1 is a graph showing MFD dependency of end face reflectance.

Problem to be Solved by the Present Disclosure

In the above-described optical connector, inhibition of end face reflection is insufficient.

Accordingly, an object of the present disclosure is to provide an optical connection structure which can sufficiently inhibit end face reflection.

Advantageous Effect of the Present Disclosure

According to the present disclosure, an optical connection structure which can sufficiently inhibit end face reflection can be provided.

Description of Embodiments of the Present Disclosure

First, embodiments of the present disclosure are listed for explanation. An optical connection structure according to one embodiment of the present disclosure includes a first spatial multiplex transmission line, a second spatial multiplex transmission line, a first lens arrangement, a second lens arrangement and a first beam diameter conversion portion. The first spatial multiplex transmission line has a plurality of first transmission lines. The second spatial multiplex transmission line has a plurality of second transmission lines. The first lens arrangement is optically coupled with the first spatial multiplex transmission line. The second lens arrangement is optically coupled with the second spatial multiplex transmission line. The first beam diameter conversion portion has a first end face and a second end face and arranged between the first spatial multiplex transmission line and the first lens arrangement. The first lens arrangement and the second lens arrangement are mutually optically coupled to propagate parallel lights between the first lens arrangement and the second lens arrangement. The first end face is in contact with the first spatial multiplex transmission line. The second end face is inclined with respect to a surface perpendicular to a center axis of each of the plurality of first transmission lines. The first beam diameter conversion portion is configured such that an optical diameter at the second end face is larger than an optical diameter at the first end face.

In the optical connection structure according to this embodiment, the first beam diameter conversion portion is configured such that an optical diameter at the second end face is larger than an optical diameter at the first end face. Consequently, compared to a case where the optical diameter at the second end face is equal to or less than the optical diameter at the first end face, reflection between the second end face and a space can be inhibited as much as possible. The end face reflection can be sufficiently inhibited.

The optical connection structure may further include a second beam diameter conversion portion having a third end face and a fourth end face and arranged between the second spatial multiplex transmission line and the second lens arrangement. The third end face may be in contact with the second spatial multiplex transmission line. The fourth end face may be inclined with respect to a surface perpendicular to a center axis of each of the plurality of second transmission lines. The second beam diameter conversion portion may be configured such that an optical diameter at the fourth end face is larger than an optical diameter at the third end face. In this case, the second beam diameter conversion portion is configured such that the optical diameter at the fourth end face is larger than the optical diameter at the third end face. Consequently, compared to a case where the optical diameter at the fourth end face is equal to or less than the optical diameter at the third end face, reflection between the fourth end face and a space can be inhibited as much as possible. The end face reflection can be sufficiently inhibited.

An anti-reflection coating may be provided on the second end face to inhibit reflection of light propagating in the plurality of first transmission lines and the plurality of second transmission lines. In this case, end face reflection can be more sufficiently inhibited.

The first spatial multiplex transmission line may be a fiber bundle including a plurality of first single core fibers and a resin. Each of the plurality of first single core fibers may include a single first core as the first transmission line. The resin may bundle the plurality of first single core fibers. Also in this case, end face reflection can be sufficiently inhibited.

The first beam diameter conversion portion may be a light-transmitting member connected to the first cores and uniformly having a refractive index which is equal to a refractive index of the first cores. In this case, without the need of considering alignment with the plurality of first transmission lines, the first beam diameter conversion portion can be arranged at the first spatial multiplex transmission line.

The first spatial multiplex transmission line may be a multicore fiber including a plurality of first cores as the plurality of first transmission lines. Also in this case, end face reflection can be sufficiently inhibited.

The first beam diameter conversion portion may be a multicore fiber including a plurality of second cores connected to the plurality of first cores. A core diameter of each of the plurality of second cores at the second end face may be larger than a core diameter of each of the plurality of second cores at the first end face. In this case, the first spatial multiplex transmission line and the first beam diameter conversion portion can be easily formed from one multicore fiber by TEC (Thermally-Expanded Core) processing.

The first beam diameter conversion portion may be a light-transmitting member connected to the plurality of first cores and uniformly having a refractive index which is equal to a refractive index of each of the plurality of first cores. In this case, without the need of considering alignment with the plurality of first transmission lines, the first beam diameter conversion portion can be arranged at the first spatial multiplex transmission line.

The first lens arrangement and the second lens arrangement may be single lenses. The first lens arrangement may be arranged such that a focal point of the first lens arrangement is positioned at an end face of the first spatial multiplex transmission line. The second lens arrangement may be arranged such that a focal point of the second lens arrangement is positioned at an end face of the second spatial multiplex transmission line. A plurality of parallel rays of light may propagate in a mutually parallel state between the first lens arrangement and the second lens arrangement. In this case, even when an optical element is arranged between the first lens arrangement and the second lens arrangement, concentration of light to a part of the optical element does not occur. Thus, a local damage of the optical element can be inhibited.

The first lens arrangement and the second lens arrangement may be single lenses and arranged such that a focal point of the first lens arrangement and a focal point of the second lens arrangement mutually overlap. The first lens arrangement may be arranged such that the focal point of the first lens arrangement is positioned at an end face of the first spatial multiplex transmission line. The second lens arrangement may be arranged such that the focal point of the second lens arrangement is positioned at an end face of the second spatial multiplex transmission line. A plurality of parallel rays of light may propagate in a mutually crossed state between the first lens arrangement and the second lens arrangement. In this case, the first spatial multiplex transmission line and the second spatial multiplex transmission line can be optically coupled with a small loss.

The optical connection structure may further include a second beam diameter conversion portion having a third end face and a fourth end face and arranged between the second spatial multiplex transmission line and the second lens arrangement. The third end face may be in contact with the second spatial multiplex transmission line. The fourth end face may be inclined with respect to a surface perpendicular to a center axis of each of the plurality of second transmission lines. The second beam diameter conversion portion may be configured such that an optical diameter at the fourth end face is larger than an optical diameter at the third end face. The second spatial multiplex transmission line may be a multicore fiber including a plurality of third cores as the plurality of second transmission lines. A ratio of a mode field diameter at the first end face of the first beam diameter conversion portion to a mode field diameter at the third end face of the second beam diameter conversion portion and a ratio of a focal length of the first lens arrangement to a focal length of the second lens arrangement may be equal to a ratio of a core pitch of the plurality of first cores and to a core pitch of the plurality of third cores. In this case, the first spatial multiplex transmission line and the second spatial multiplex transmission line having different core pitches can be connected.

The first lens arrangement may be a lens array having a plurality of lenses corresponding to each of the plurality of first cores. In this case, each lens is provided to correspond to each core, so that variation of lens property depending on an irradiated position of light can be inhibited.

The optical connection structure may further include an isolator core optically coupled with the first lens arrangement and the second lens arrangement to pass light only in one direction. In this case, return light can be inhibited.

The optical connection structure may further include a filter optically connected to the first lens arrangement and the second lens arrangement and capable of multiplexing or demultiplexing lights with different wavelengths. In this case, for example, the optical connection structure is applied to an optical amplification system, and one or more pump lights and signal lights can be coupled.

The filter may couple a pump light with a signal light output from the first lens arrangement and input the pump light and the signal light into the second lens arrangement. The second spatial multiplex transmission line may contain rare earth. The second spatial multiplex transmission line may amplify the signal light input from the second lens arrangement by the pump light input from the second lens arrangement. Also in this case, end face reflection can be sufficiently inhibited. Moreover, since a plurality of optical amplifiers can be aggregated to one, a more compact configuration can be achieved.

The optical connection structure may further include a movable mirror to optically couple two lens arrangements of three or more lens arrangements including the first lens arrangement and the second lens arrangement. Also in this case, end face reflection can be sufficiently inhibited. Moreover, in this case, a more compact configuration can be achieved.

An optical diameter of the first transmission line may be 6 μm or less. In this way, even in a case where the first transmission line has a small diameter, end face reflection can be sufficiently inhibited.

An optical diameter at the second end face may be 8 μm or more. In this case, end face reflection can be sufficiently inhibited.

Detailed Description of the Embodiments of the Present Disclosure

The embodiments of the optical connection structure of the present disclosure will be explained with reference to the drawings below. The present invention is not limited to these illustrations and shown by the claims, and intends to include all variations in the meaning which is equal to the claims or within the range of the claims. In the explanation of the drawings, the same components are applied the same reference numerals, and overlapping explanation is omitted.

In accordance with an accelerated capacity enlargement of a photonic network, densification of a transmission line is required. Examples of a device which achieves a high-density transmission line include a small diameter fiber and a MCF. According to the former, a plurality of fibers can be bundled at high density since a cladding diameter is thinned. According to the latter, a plurality of cores is arranged in a single cladding with an appropriate core pitch, thereby increasing the number of cores in one fiber and achieving densification. However, even with densification of the transmission line, the entire system cannot be densified unless optical components such as a connector, a coupler and a filter connecting the transmission line are densified. Further, regarding an optical system which is subjected to space coupling to the coupler and the filter etc., there is a problem in optical properties even when densification can be executed.

As one problem, reflection at a fiber end face can be listed. Examples of a method of inhibiting the reflection at a fiber end face include (a) a method of obliquely polishing an end face, or (b) a method of providing AR coating at the end face. The small diameter fiber and the MCF suffer from limitation of a mode field diameter (hereinafter, it is also abbreviated as "MFD") due to densification. Consequently, in the small diameter fiber and the MCF, end face reflection is made larger compared to an ordinary transmission fiber. Actually, a reflection ratio $R_\theta$ in oblique polishing is shown in the formula (1), wherein a MFD of a fiber is A, a refractive index is n, a polishing angle is $\theta$ and a reflection ratio with a polishing angle of 0 is $R_0$.

[Equation 1]

$$R_\theta = R_0 \cdot \exp\left\{-\left(\frac{\pi n A \theta}{\lambda}\right)^2\right\} \quad (1)$$

FIG. 1 is a graph showing MFD dependency of end face reflectance. The abscissa of the graph shows MFD, and the ordinate shows end face reflectance. In FIG. 1, MFD dependency of end face reflectance at a wavelength of 1550 nm is shown for each case where a polishing angle of 0 degree, a polishing angle of 4 degrees and a polishing angle of 8 degrees. FIG. 1 shows a case where the above (b) is not considered, that is, no AR coating is provided at an end face ($R_0 = -15$ dB). As shown in FIG. 1, in a case of oblique polishing with a polishing angle of 8 degrees which is frequently used, for a small diameter fiber with the MFD of 4.2 μm, end face reflectance is −29 dB.

Problems occurring in end face reflectance include (A) instability of a laser due to return light to the laser, (B) deterioration of transmission property due to multiple reflection in a transmission line and (C) deterioration of amplification property due to multiple reflection in an optical amplifier. The above (A) can occur when there is an end face at a destination of a laser for signal or a laser for excitation. If there is a considerable amount of return light, quality of a laser light is deteriorated due to enlargement of the width of a light beam, mode hopping and increase of a relative intensity noise (RIN) etc. It is known that life shortening and internal damage of a laser can be caused especially in a case of a high-power laser. In cited reference 1 below, it is described that there is influence even with a reflection ratio of 0.1% (−30 dB.)

(Cited reference 1) G. P. Agrawal, "Fiber-Optic Communication Systems," Wiley.

The above (B) can occur when two or more reflection points exist at the transmission line. A minute signal light component propagating with several times of reciprocation is generated, and the signal light component interferes with an original signal light, whereby a noise called as MPI (Multipath Interference) is generated. An acceptable level of the MPI depends on a transmission form, and cited reference 2 below describes that, in a case of PAM-8 transmission of 32 Gbaud, a reflection ratio of −35 dB or less is required in order to satisfy IEC standards.

(Cited reference 2) C. R. S. Fludger et. al, "Experimental measurements of the impact of multi-path interference on PAM signal," OFC Proceedings, W1F6, 2014.

The above (C) can occur when there is an end face at an input/output of the optical amplifier. An oscillation phenomenon occurs when the product of a reflection ratio and a gain of an optical amplification medium is equal to 1 or more, so that an operation of the optical amplifier is made unstable. Even when the reflection ratio is below the gain, noise figure (NF) due to the above-described MPI may increase. To ensure the property of the optical amplifier, at least a reflection ratio of −40 dB to −45 dB is required.

In view of this, end face reflectance of the small diameter fiber does not reach any required level for usages assumed in (A) to (C). In a case where the AR coating of the above (b) is additionally applied, since a typical reflection ratio of the AR coating in a communication band is R0<0.25% (<−26 dB), end face reflectance of the small diameter fiber is lowered to −41 dB. Due to this, although the end face reflectance of the small diameter fiber clears the required level of the above (A) and (B), this is not sufficient to the required level of the above (C).

First Embodiment

Figure 2:
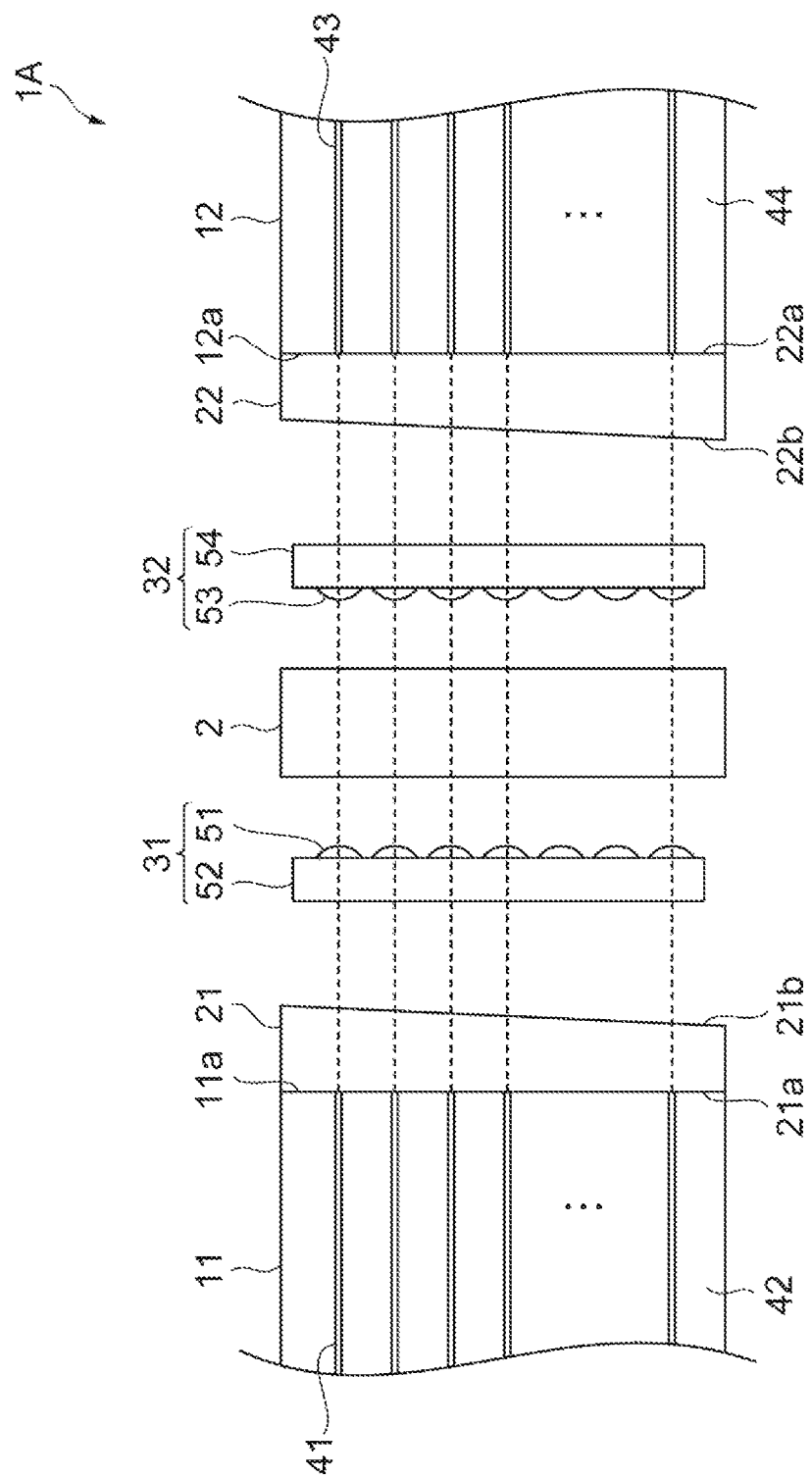
FIG. 2 illustrates an optical connection structure according to a first embodiment.

FIG. 2 illustrates an optical connection structure according to the first embodiment. As shown in FIG. 2, an optical connection structure 1A includes a first spatial multiplex transmission line 11, a second spatial multiplex transmission line 12, a first beam diameter conversion portion 21, a second beam diameter conversion portion 22, a first lens arrangement 31, a second lens arrangement 32 and a transmission optical element 2. The optical connection structure 1A is a spatial optical system which mutually connects the first spatial multiplex transmission line 11 and the second spatial multiplex transmission line 12.

The first spatial multiplex transmission line 11 is a MCF for example, which includes a plurality of cores 41 (first transmission lines) as transmission lines and a cladding 42 which covers the plurality of cores 41. The plurality of cores 41 includes a center core arranged at the center of a cross section of the first spatial multiplex transmission line 11 and a plurality of outer circumferential cores surrounding the center core. The first spatial multiplex transmission line 11 may be a fiber bundle in which a plurality of first single core fibers (hereinafter, it is also abbreviated as "SCF") each of which includes a single core 41 is bundled by a resin. In this case, the first spatial multiplex transmission line 11 may have a circular cross section for example, and the plurality of first SCFs may be arranged in a hexagonal close-packed structure. For example, the first spatial multiplex transmission line 11 may be a tape fiber in which the plurality of first SCFs is arranged in a one-dimensional array.

The second spatial multiplex transmission line 12 is the MCF for example, which includes a plurality of cores 43 (second transmission lines) as transmission lines and a cladding 44 which covers the plurality of cores 43. For example, the plurality of cores 43 includes a center core arranged at the center of a cross section of the second spatial multiplex transmission line 12 and a plurality of outer circumferential cores surrounding the center core. The second spatial multiplex transmission line 12 may be the fiber bundle in which a plurality of second SCFs each of which includes a single core 43 is bundled by a resin. In this case, the second spatial multiplex transmission line 12 may have a circular cross section for example, and the plurality of second SCFs may be arranged in a hexagonally filled state. The second spatial multiplex transmission line 12 may be a tape fiber in which the plurality of second SCFs is arranged in a one-dimensional array.

The first beam diameter conversion portion 21 is arranged between the first spatial multiplex transmission line 11 and the first lens arrangement 31. The first beam diameter conversion portion 21 is used for converting an optical diameter. The first beam diameter conversion portion 21 includes an end face 21a and an end face 21b. The first beam diameter conversion portion 21 is configured such that an optical diameter at the end face 21b is larger than an optical diameter at the end face 21a. The optical diameter is for example, a beam diameter or a MFD. The end face 21b is inclined with respect to a surface perpendicular to a center axis of each of the plurality of cores 41, and an inclined angle thereof is 8 degrees or less, for example.

At the end face 21b, AR coating (not shown) which inhibits reflection of light propagating through the plurality of cores 41 may be provided. The AR coating inhibits reflection in a wavelength of light passing through the transmission line. The AR coating is provided by vapor deposition, for example. The first beam diameter conversion portion 21 is arranged such that the end face 21a is in contact with an end face 11a of the first spatial multiplex transmission line 11. The first beam diameter conversion portion 21 is, for example, a light-transmitting member (a spacer) connected to all the plurality of cores 41 and uniformly having a refractive index which is equal to a refractive index of each of the plurality of cores 41. In this case, the first beam diameter conversion portion 21 is provided at the end face 11a, for example, by adhesion. Since the refractive index of the first beam diameter conversion portion 21 is equal to the refractive index of the cores 41, reflection of light between the cores 41 and the first beam diameter conversion portion 21 is inhibited. The thickness of the first beam diameter conversion portion 21 (a spacer) (the shortest distance between the end face 21a and the end face 21b) is determined in accordance with optical diameters before and after conversion. For example, when a beam diameter of light with a wavelength of 1.55 µm emitted from a fiber is converted from 4.2 µm to 10 µm, the thickness of the spacer needs to be approximately 29 µm.

The second beam diameter conversion portion 22 is arranged between the second spatial multiplex transmission line 12 and a second lens arrangement 32. The second beam diameter conversion portion 22 is used for converting an optical diameter. The second beam diameter conversion portion 22 includes an end face 22a and an end face 22b. The second beam diameter conversion portion 22 is configured such that an optical diameter at the end face 22b is larger than an optical diameter at the end face 22a. The optical diameter is for example, a beam diameter or a MFD. The end face 22b is inclined with respect to a surface perpendicular to a center axis of each of the plurality of cores 43, and an inclined angle thereof is 8 degrees or less, for example.

At the end face 22b, the AR coating (not shown) which inhibits reflection of light propagating through the plurality of cores 43 may be provided. The AR coating inhibits reflection in a wavelength of light passing through the transmission line. The AR coating is provided by vapor deposition, for example. The second beam diameter conversion portion 22 is arranged such that the end face 22a is in contact with an end face 12a of the second spatial multiplex transmission line 12. The second beam diameter conversion portion 22 is, for example, a light-transmitting member (a spacer) connected to all the plurality of cores 43 and uniformly having a refractive index which is equal to a refractive index of each of the plurality of cores 43. In this case, the second beam diameter conversion portion 22 is provided at the end face 12a, for example, by adhesion.

Since the refractive index of the second beam diameter conversion portion 22 is equal to the refractive index of the cores 43, reflection of light between the cores 43 and the second beam diameter conversion portion 22 is inhibited. The thickness of the second beam diameter conversion portion 22 (a spacer) (the shortest distance between the end face 22a and the end face 22b) is determined in accordance with optical diameters before and after conversion. For example, when the beam diameter of the light with the wavelength of 1.55 µm emitted from the fiber is converted from 4.2 µm to 10 µm, the thickness of the spacer needs to be approximately 29 µm.

The first lens arrangement 31 and the second lens arrangement 32 are mutually optically connected. The first lens arrangement 31 and the second lens arrangement 32 propagate parallel lights between the first lens arrangement 31 and the second lens arrangement 32. In other words, the first lens arrangement 31 and the second lens arrangement 32 have a collimated lens. Between the first lens arrangement 31 and the second lens arrangement 32, a plurality of parallel rays of light propagates in a mutually parallel state. For example, the first lens arrangement 31 and the second lens arrangement 32 mutually have the same shape.

The first lens arrangement 31 is optically connected to the end face 21b. The first lens arrangement 31 is arranged to face the end face 21b. For example, the first lens arrangement 31 is a lens array including a plurality of lenses 51 each of which respectively corresponds to the plurality of cores 41 and a retention portion 52 to hold the plurality of lenses 51. For example, the plurality of lenses 51 has mutually the same shape, and the focal length is mutually the same. The first lens arrangement 31 is arranged to be separated from the end face 11a of the first spatial multiplex transmission line 11 by a focal length of the lenses 51. The first lens arrangement 31 is arranged such that the focal point of the lenses 51 is positioned at the corresponding core 41 at the end face 11a.

The second lens arrangement 32 is optically connected to the end face 22b. The second lens arrangement 32 is arranged to face the end face 22b. For example, the second lens arrangement 32 is a lens array including a plurality of lenses 53 each of which respectively corresponds to the plurality of cores 43 and a retention portion 54 to hold the plurality of lenses 53. For example, the plurality of lenses 53 has mutually the same shape, and the focal lengths are mutually the same. The second lens arrangement 32 is arranged to be separated from the end face 12a of the second spatial multiplex transmission line 12 by a focal length of the lenses 53. The second lens arrangement 32 is arranged such that the focal point of the lenses 53 is positioned at the corresponding core 43 at the end face 12a.

The transmission optical element 2 is, for example, an isolator core or a filter. The transmission optical element 2 is arranged between the first lens arrangement 31 and the second lens arrangement 32, and is optically connected to the first lens arrangement 31 and the second lens arrangement 32. Since the isolator core passes light only in one direction, return light can be inhibited. The filter can multiplex or demultiplex lights with different wavelengths. The optical connection structure 1A does not necessarily include the transmission optical element 2.

In the optical connection structure 1A, for example, each light emitted from each core 41 at the end face 11a of the first spatial multiplex transmission line 11 passes through the first beam diameter conversion portion 21. At this time, the diameter of each light is enlarged by the first beam diameter conversion portion 21. In other words, the optical diameter at the end face 21b is larger than the optical diameter at the end face 21a. Each light in which the diameter is enlarged by the first beam diameter conversion portion 21 becomes a parallel light by the first lens arrangement 31. A plurality of parallel rays of light executes spatial propagation with no mutual overlap, and passes through the transmission optical element 2. Subsequently, the plurality of parallel rays of light is collected by the second lens arrangement 32 to pass through the second beam diameter conversion portion 22. Accordingly, the optical diameter at the end face 22b is larger than the optical diameter at the end face 22a. Each light passing through the second beam diameter conversion portion 22 is connected to each core 43 at the end face 12a.

The core diameter of the cores 41, 43 may be 6 µm or less, 5 µm or less or 4 µm or less, for example. In this way, even when the cores 41, 43 have a small diameter, end face reflection can be sufficiently inhibited. The optical diameter at the end faces 11a, 12a and the optical diameter at the end faces 21a, 22a are equal to the core diameter of the cores 41, 43.

The optical diameter at the end faces 21b, 22b may be 8 µm or more, 9 µm or more or 10 µm or more, for example. The end face reflection can be sufficiently inhibited. The optical diameter at the end faces 21b, 22b may be 13 µm or less, 12 µm or less or 11 µm or less. This inhibits crosstalk between the cores of the MCFs.

As explained above, in the optical connection structure 1A, the first beam diameter conversion portion 21 is arranged between the first spatial multiplex transmission line 11 and the first lens arrangement 31. The end face 21b is obliquely polished. Further, the first beam diameter conversion portion 21 is configured such that the optical diameter at the end face 21b is larger than the optical diameter at the end face 21a. Consequently, in the optical connection structure 1A, compared to a case where the optical diameter at the end face 21b is equal to or less than the optical diameter at the end face 21a, reflection between the end face 21b and a space can be inhibited as much as possible. Also, in the optical connection structure 1A, the second beam diameter conversion portion 22 is arranged between the second spatial multiplex transmission line 12 and the second lens arrangement 32. The end face 22b is obliquely polished. Further, the second beam diameter conversion portion 22 is configured such that the optical diameter at the end face 22b is larger than the optical diameter at the end face 22a. Consequently, in the optical connection structure 1A, compared to a case where the optical diameter at the end face 22b is equal to or less than the optical diameter at the end face 22a, reflection between the end face 22b and a space can be inhibited as much as possible. In view of this, according to the optical connection structure 1A, end face reflection can be sufficiently inhibited.

At a polished surface which is obliquely polished, an optical axis is tilted, so that coupling loss tends to be larger. As a measure, in the optical connection structure 1A, the optical diameters at the end faces 21b, 22b which are obliquely polished are made larger, and further, the AR coating is provided at the end faces 21b, 22b. Accordingly, an amount of reflection can be a predetermined value or less even when a polishing angle is small, which inhibits both coupling loss and reflection.

Between the first lens arrangement 31 and the second lens arrangement 32, a plurality of parallel rays of light propagates in a parallel state with no mutual overlap. Accordingly, even when the transmission optical element 2 is arranged between the first lens arrangement 31 and the second lens arrangement 32, concentration of light to a part of the transmission optical element 2 does not occur. Thus, a local damage of the transmission optical element 2 can be inhibited.

In a single lens, lens property can vary depending on an irradiated position of light. In the optical connection structure 1A, the first lens arrangement 31 and the second lens arrangement 32 are a lens array, and each lens 51, 53 are provided to respectively correspond to each core 41, 43. Accordingly, variation of lens property depending on the irradiated position of light can be inhibited.

Second Embodiment

Figure 3:
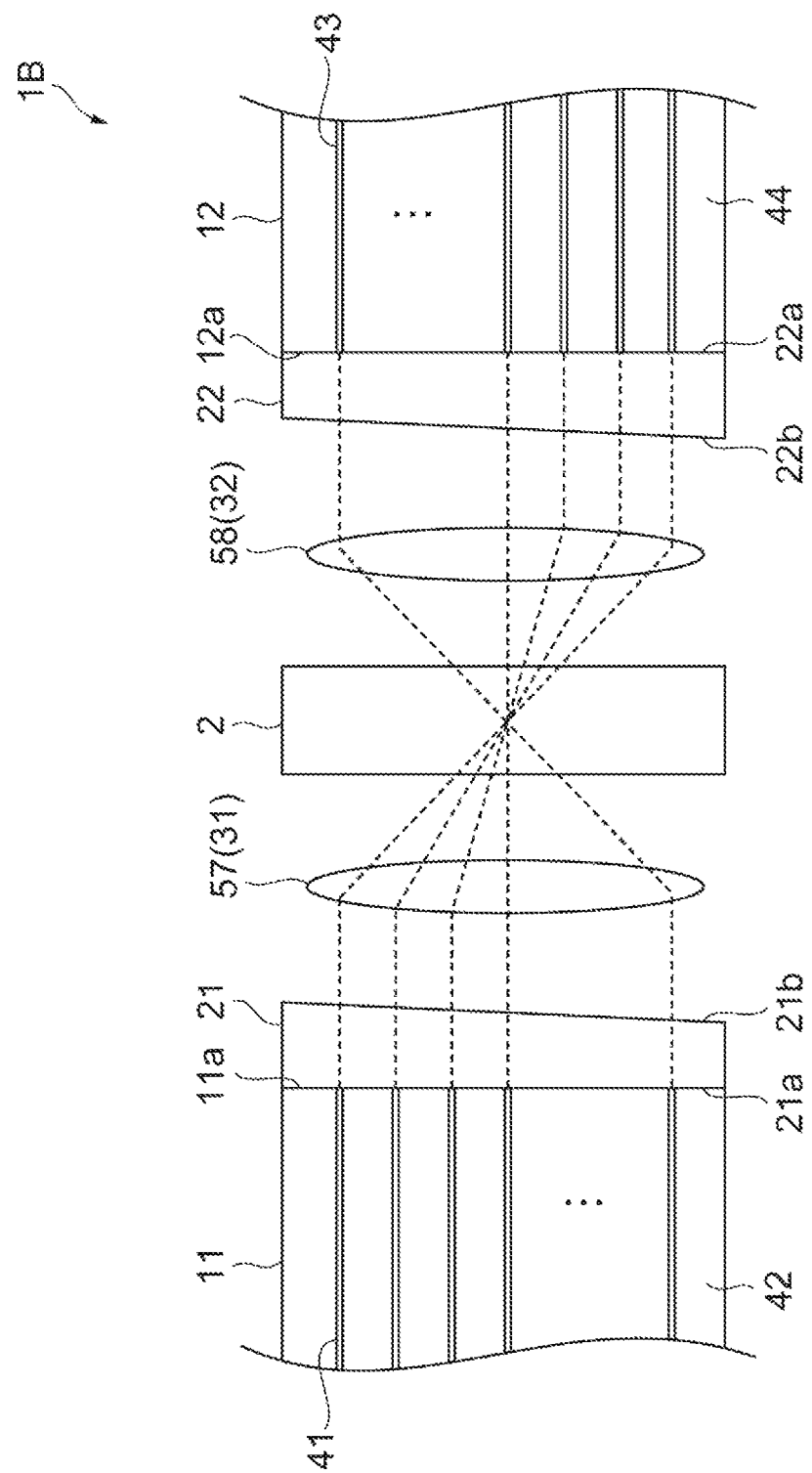
FIG. 3 illustrates an optical connection structure according to a second embodiment.

FIG. 3 illustrates an optical connection structure according to the second embodiment. Regarding an optical connection structure 1B according to the second embodiment, an explanation will be made mainly focusing on the difference from the optical connection structure 1A. As shown in FIG. 3, in the optical connection structure 1B, the first lens arrangement 31 is a single lens 57. Also, the second lens arrangement 32 is a single lens 58. Further, between the first lens arrangement 31 and the second lens arrangement 32, a plurality of parallel rays of light propagates in a mutually crossed state.

The lenses 57, 58 have mutually the same shape, for example, and the focal lengths are mutually the same. The first lens arrangement 31 and the second lens arrangement 32 are arranged to be separated by a double focal length of the lenses 57, 58. The first lens arrangement 31 and the second lens arrangement 32 are arranged such that focal points of the lenses 57, 58 mutually overlap. The first lens arrangement 31 is arranged to be separated from the end face 11a of the first spatial multiplex transmission line 11 by the focal length of the lens 57. The first lens arrangement 31 is arranged such that the focal point of the lens 57 is positioned at the end face 11a. The second lens arrangement 32 is arranged to be separated from the end face 12a of the second spatial multiplex transmission line 12 by the focal length of the lens 58. The second lens arrangement 32 is arranged such that the focal point of the lens 58 is positioned at the end face 12a. A distance from the transmission optical element 2 to the lens 57 is equal to a distance from the transmission optical element 2 to the lens 58.

In the optical connection structure 1B, for example, each light emitted from each core 41 at the end face 11a of the first spatial multiplex transmission line 11 passes through the first beam diameter conversion portion 21. At this time, the diameter of each light is enlarged by the first beam diameter conversion portion 21. In other words, the optical diameter at the end face 21b is larger than the optical diameter at the end face 21a. Each light in which the diameter is enlarged by the first beam diameter conversion portion 21 becomes a parallel light by the first lens arrangement 31. At a position of the transmission optical element 2, a plurality of parallel rays of light crosses at a point and passes through the transmission optical element 2. Subsequently, the plurality of parallel rays of light is collected by the second lens arrangement 32 to pass through the second beam diameter conversion portion 22. Accordingly, the optical diameter at the end face 22b is larger than the optical diameter at the end face 22a. Each light passing through the second beam diameter conversion portion 22 is connected to each core 43 at the end face 12a.

In the same manner as the optical connection structure 1A, also in the optical connection structure 1B, the optical diameter at the end faces 21b, 22b is larger than the optical diameter at the end faces 21a, 22b. Thus, end face reflection can be sufficiently inhibited.

Third Embodiment

Figure 4:
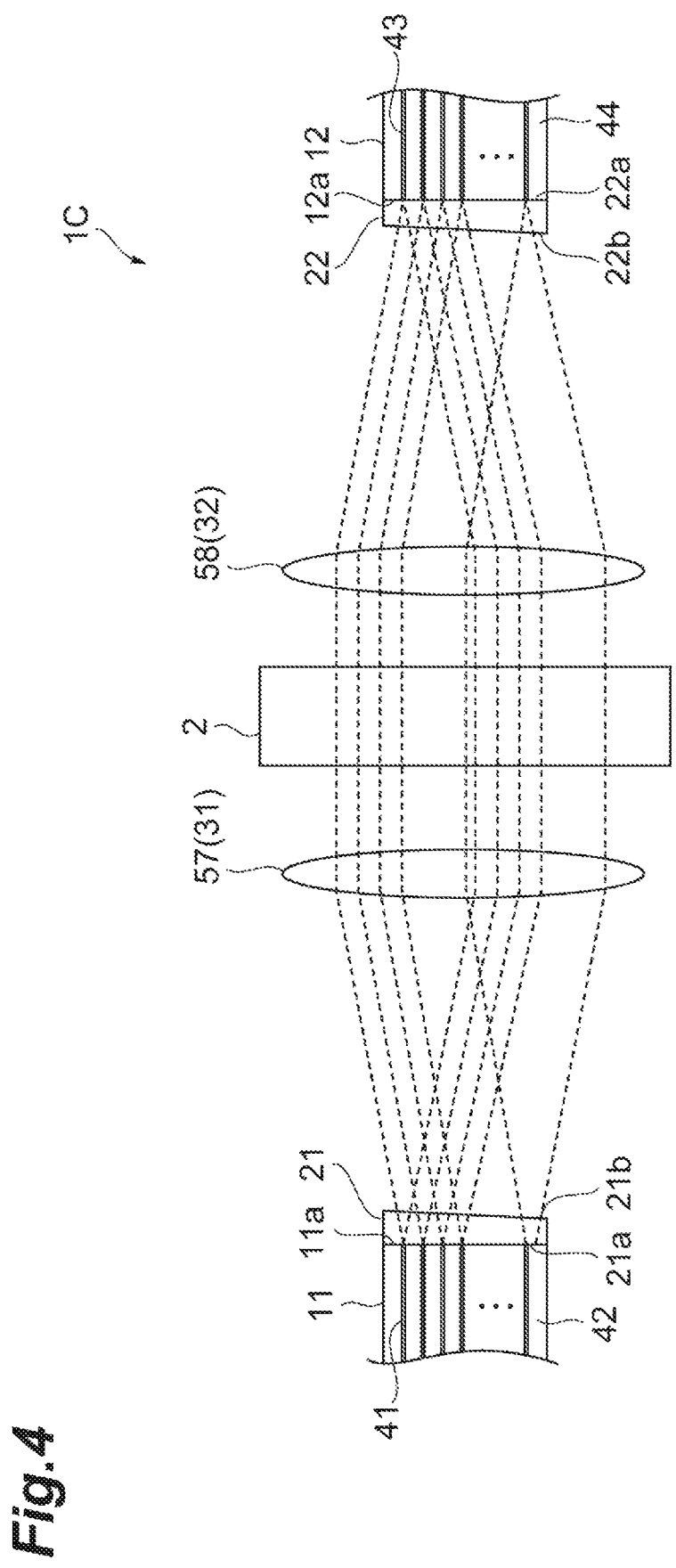
FIG. 4 illustrates an optical connection structure according to a third embodiment.

FIG. 4 illustrates an optical connection structure according to the third embodiment. Regarding an optical connection structure 1C according to the third embodiment, an explanation will be made mainly focusing on the difference from the optical connection structure 1B. As shown in FIG. 4, in the optical connection structure 1C, between the first lens arrangement 31 and the second lens arrangement 32, a plurality of parallel rays of light propagates in a mutually parallel state.

Also in the optical connection structure 1C, for example, the lenses 57, 58 have mutually the same shape and the focal lengths are mutually the same. The first lens arrangement 31 is arranged to be separated from the end face 11a of the first spatial multiplex transmission line 11 by a focal length of the lens 57. The first lens arrangement 31 is arranged such that the focal point of the lens 57 is positioned at the end face 11a. The second lens arrangement 32 is arranged to be separated from the end face 12a of the second spatial multiplex transmission line 12 by the focal length of the lens 58. The second lens arrangement 32 is arranged such that the focal point of the lens 58 is positioned at the end face 12a. A distance from the transmission optical element 2 to the lens 57 is equal to a distance from the transmission optical element 2 to the lens 58.

In the optical connection structure 1C, for example, each light emitted from each core 41 at the end face 11a of the first spatial multiplex transmission line 11 passes through the first beam diameter conversion portion 21. At this time, the diameter of each light is enlarged by the first beam diameter conversion portion 21. In other words, the optical diameter at the end face 21b is larger than the optical diameter at the end face 21a. Each light in which the diameter is enlarged by the first beam diameter conversion portion 21 becomes a parallel light by the first lens arrangement 31. A plurality of parallel rays of light executes spatial propagation with mutual overlap, and passes through the transmission optical element 2. Subsequently, the plurality of parallel rays of light is collected by the second lens arrangement 32 to pass through the second beam diameter conversion portion 22. Accordingly, the optical diameter at the end face 22b is larger than the optical diameter at the end face 22a. Each light passing through the second beam diameter conversion portion 22 is connected to each core 43 at the end face 12a.

In the same manner as the optical connection structure 1A, also in the optical connection structure 1C, the optical diameter at the end faces 21b, 22b is larger than the optical diameter at the end faces 21a, 22b. Thus, end face reflection can be sufficiently inhibited.

Fourth Embodiment

Figure 5:
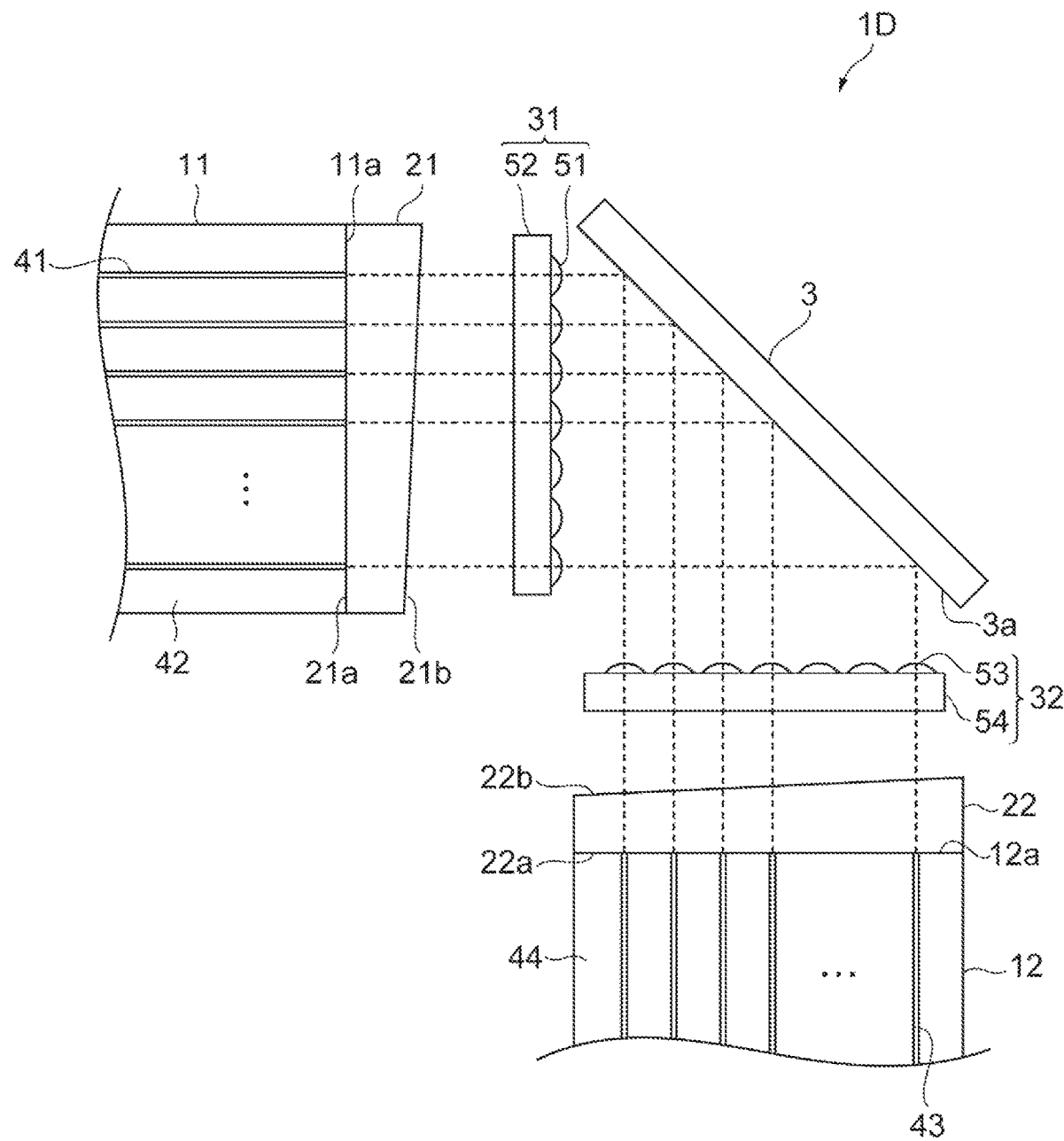
FIG. 5 illustrates an optical connection structure according to a fourth embodiment.

FIG. 5 illustrates an optical connection structure according to the fourth embodiment. Regarding an optical connection structure 1D according to the fourth embodiment, an explanation will be made mainly focusing on the difference from the optical connection structure 1A. As shown in FIG. 5, the optical connection structure 1D includes a reflective optical element 3 instead of the transmission optical element 2 (see FIG. 2). The reflective optical element 3 is, for example, a filter or a movable mirror. Examples of the movable mirror include a MEMS (Micro-Electro-Mechanical Systems) mirror and a MEMS mirror array. The reflective optical element 3 has a reflection surface 3a. The reflective optical element 3 is arranged such that the reflection surface 3a is inclined with respect to the center axis of each of the cores 41 and the center axis of each of the cores 43 by 45 degrees, for example. 45 degrees is not necessarily applied unless the transmission lines interfere.

In the optical connection structure 1D, for example, each light emitted from each core 41 at the end face 11a of the first spatial multiplex transmission line 11 passes through the first beam diameter conversion portion 21. At this time, the diameter of each light is enlarged by the first beam diameter conversion portion 21. In other words, the optical diameter at the end face 21b is larger than the optical diameter at the end face 21a. Each light in which the diameter is enlarged by the first beam diameter conversion portion 21 becomes a parallel light by the first lens arrangement 31. A plurality of parallel rays of light executes spatial propagation with no mutual overlap, and is reflected by the reflection surface 3a of the reflective optical element 3. Subsequently, the plurality of parallel rays of light is collected by the second lens arrangement 32 to pass through the second beam diameter conversion portion 22. Accordingly, the optical diameter at the end face 22b is larger than the optical diameter at the end face 22a. Each light passing through the second beam diameter conversion portion 22 is coupled with each core 43 at the end face 12a.

In the same manner as the optical connection structure 1A, also in the optical connection structure 1C, the optical diameter at the end faces 21b, 22b is larger than the optical diameter at the end faces 21a, 22a. Thus, end face reflection can be sufficiently inhibited. Also, in the same manner as the optical connection structure 1A, in the optical connection structure 1D, between the first lens arrangement 31 and the second lens arrangement 32, a plurality of parallel rays of light propagates in a parallel state with no mutual overlap. Accordingly, even when the reflective optical element 3 is arranged between the first lens arrangement 31 and the second lens arrangement 32, concentration of light to a part of the reflective optical element 3 does not occur. Thus, a local damage of the reflective optical element 3 can be inhibited.

Fifth Embodiment

Figure 6:
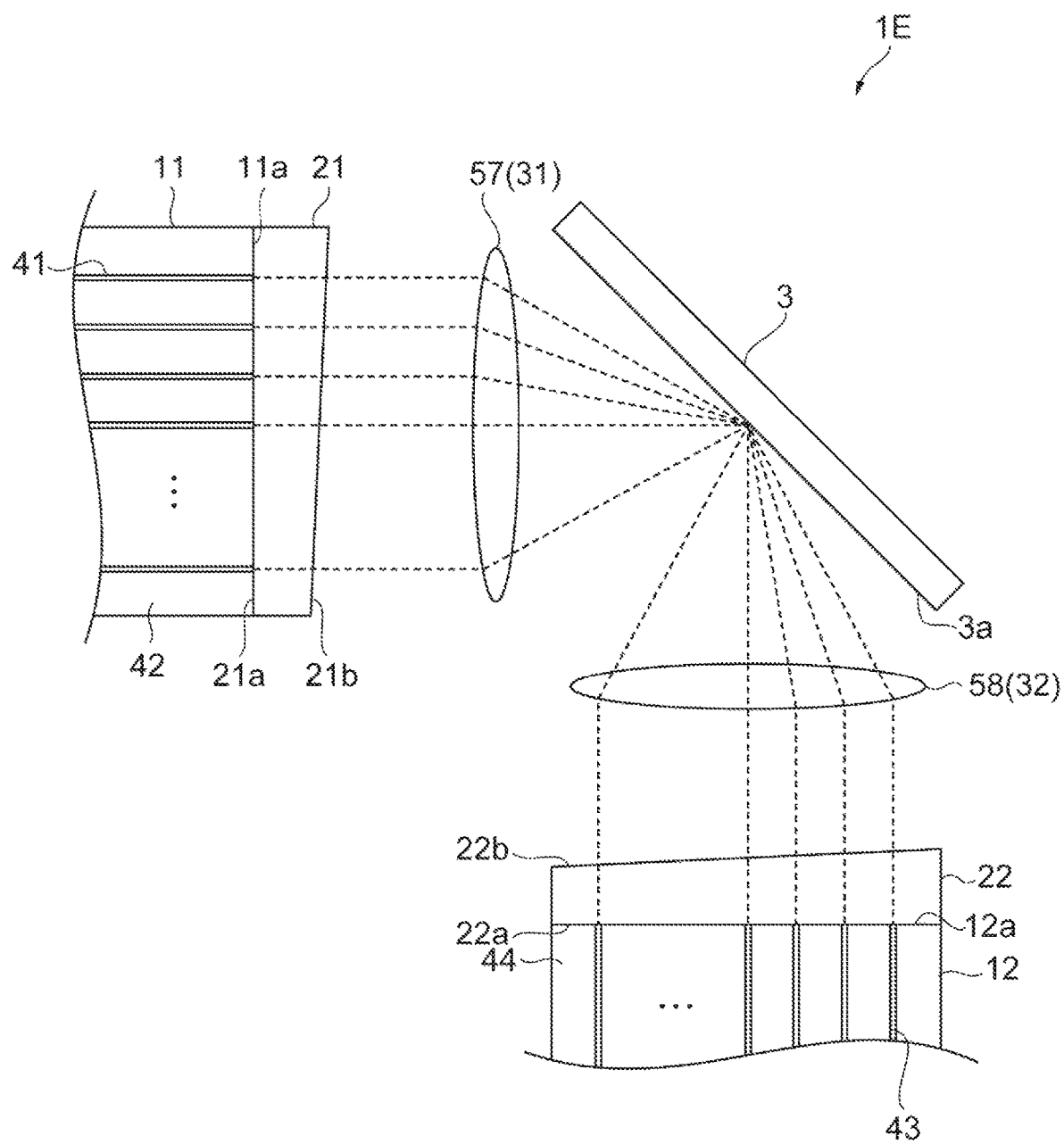
FIG. 6 illustrates an optical connection structure according to a fifth embodiment.

FIG. 6 illustrates an optical connection structure according to the fifth embodiment. Regarding an optical connection structure 1E according to the fifth embodiment, an explanation will be made mainly focusing on the difference from the optical connection structure 1B. As shown in FIG. 6, the optical connection structure 1E includes the reflective optical element 3 instead of the transmission optical element 2 (see FIG. 3).

In the optical connection structure 1E, for example, each light emitted from each core 41 at the end face 11a of the first spatial multiplex transmission line 11 passes through the first beam diameter conversion portion 21. At this time, the diameter of each light is enlarged by the first beam diameter conversion portion 21. In other words, the optical diameter at the end face 21b is larger than the optical diameter at the end face 21a. Each light in which the diameter is enlarged by the first beam diameter conversion portion 21 becomes a parallel light by the first lens arrangement 31. At a position of the reflection surface 3a of the reflective optical element 3, a plurality of parallel rays of light crosses at a point and is reflected by the reflection surface 3a. Subsequently, the plurality of parallel rays of light is collected by the second lens arrangement 32 to pass through the second beam diameter conversion portion 22. Accordingly, the optical diameter at the end face 22b is larger than the optical diameter at the end face 22a. Each light passing through the second beam diameter conversion portion 22 is coupled with each core 43 at the end face 12a.

In the same manner as the optical connection structure 1A, also in the optical connection structure 1E, the optical diameter at the end faces 21b, 22b is larger than the optical diameter at the end faces 21a, 22a. Thus, end face reflection can be sufficiently inhibited.

Sixth Embodiment

Figure 7:
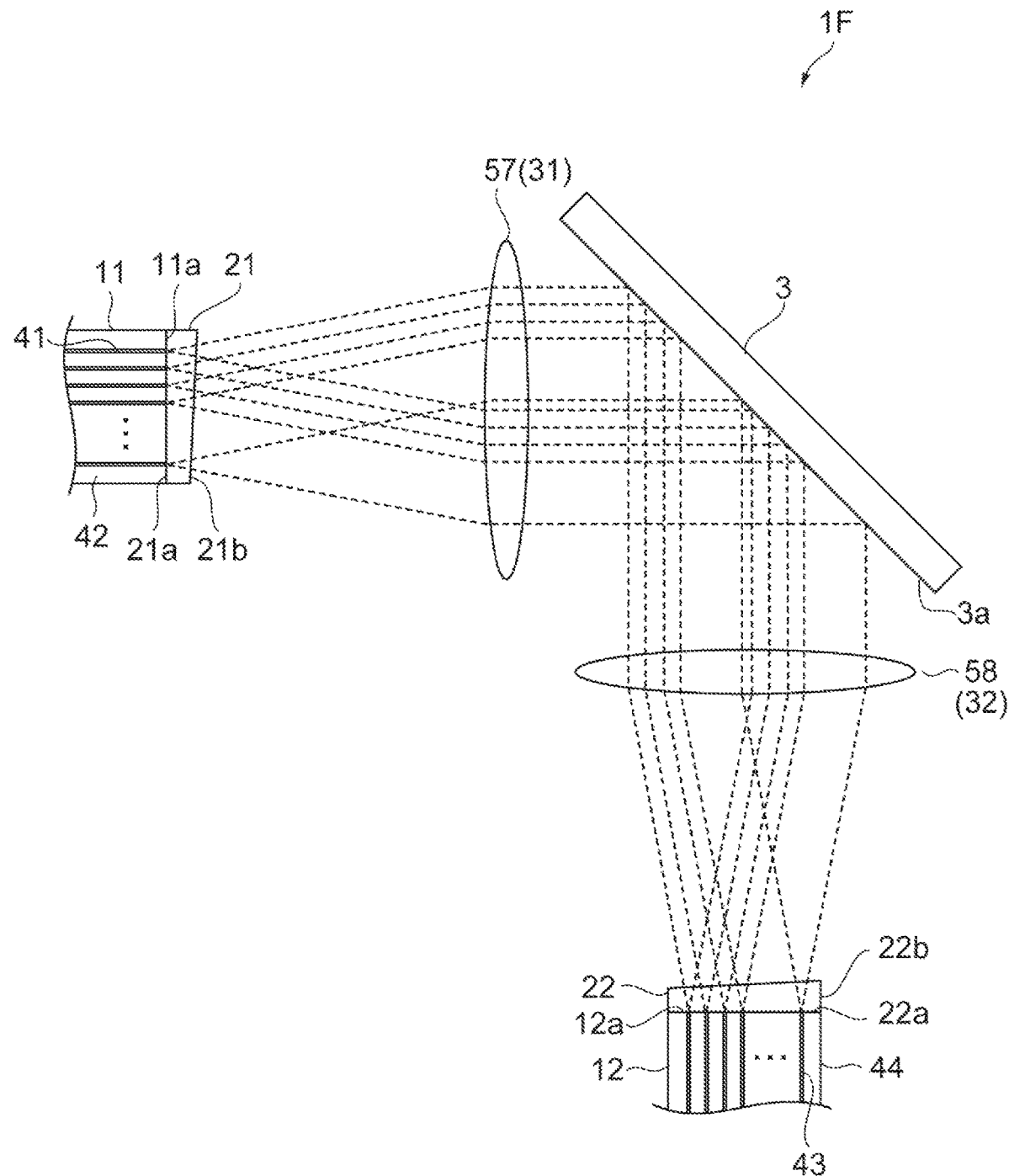
FIG. 7 illustrates an optical connection structure according to a sixth embodiment.

FIG. 7 illustrates an optical connection structure according to the sixth embodiment. Regarding an optical connection structure 1F according to the sixth embodiment, an explanation will be made mainly focusing on the difference from the optical connection structure 1C. As shown in FIG. 7, the optical connection structure 1F includes the reflective optical element 3 instead of the transmission optical element 2 (see FIG. 3).

In the optical connection structure 1F, for example, each light emitted from each core 41 at the end face 11a of the first spatial multiplex transmission line 11 passes through the first beam diameter conversion portion 21. At this time, the diameter of each light is enlarged by the first beam diameter conversion portion 21. In other words, the optical diameter at the end face 21b is larger than the optical diameter at the end face 21a. Each light in which the diameter is enlarged by the first beam diameter conversion portion 21 becomes a parallel light by the first lens arrangement 31. A plurality of parallel rays of light executes spatial propagation with mutual overlap, and is reflected by the reflection surface 3a of the reflective optical element 3. Subsequently, the plurality of parallel rays of light is collected by the second lens arrangement 32 to pass through the second beam diameter conversion portion 22. Accordingly, the optical diameter at the end face 22b is larger than the optical diameter at the end face 22a. Each light passing through the second beam diameter conversion portion 22 is coupled with each core 43 at the end face 12a.

In the same manner as the optical connection structure 1A, also in the optical connection structure 1F, the optical diameter at the end faces 21b, 22b is larger than the optical diameter at the end faces 21a, 22a. Thus, end face reflection can be sufficiently inhibited.

Seventh Embodiment

Figure 8:
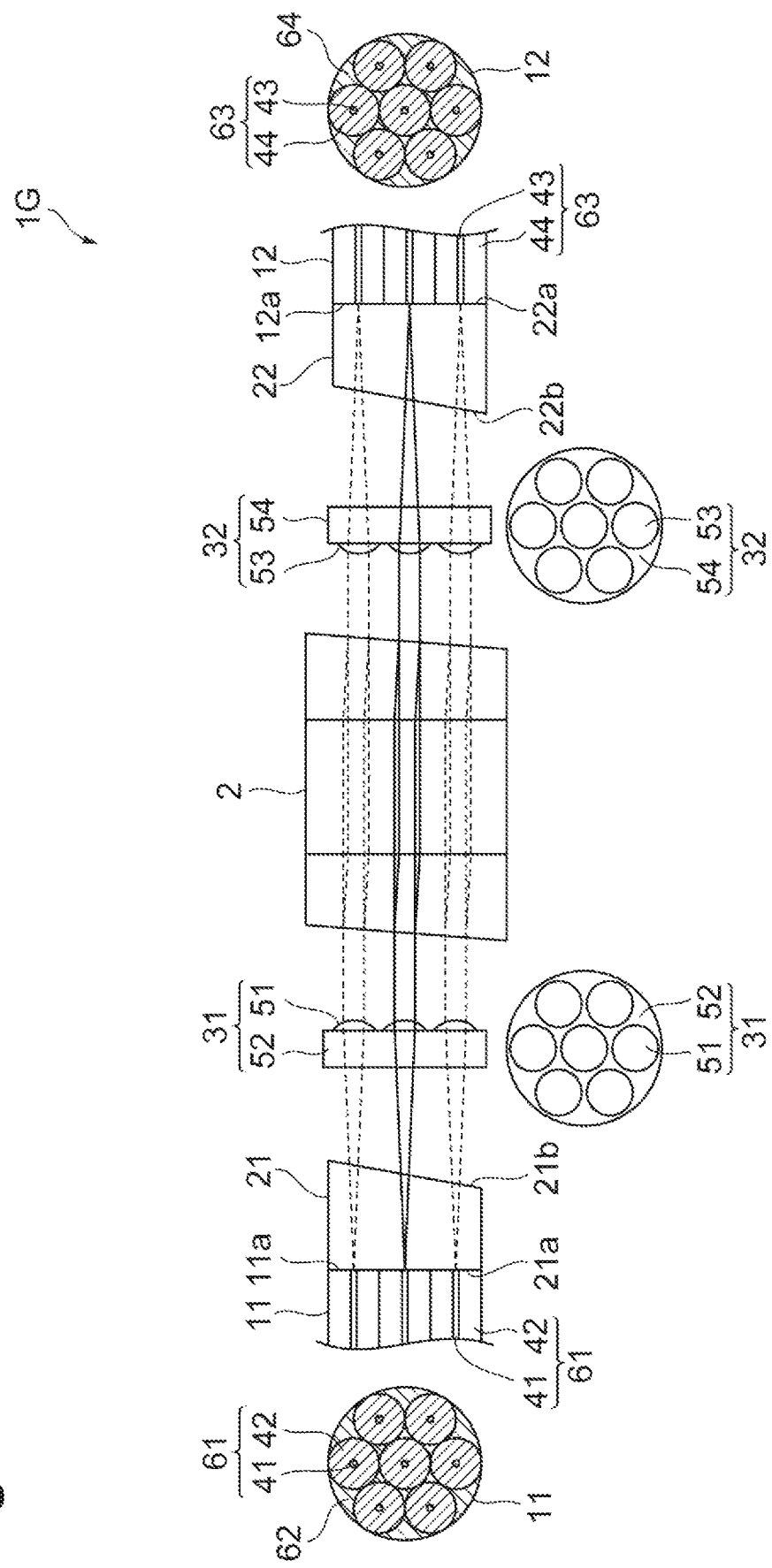
FIG. 8 illustrates an optical connection structure according to a seventh embodiment.

FIG. 8 illustrates an optical connection structure according to the seventh embodiment. An optical connection structure 1G according to the seventh embodiment is constructed based on the optical connection structure 1A. In FIG. 8, cross-sectional configurations of the first spatial multiplex transmission line 11 and the second spatial multiplex transmission line 12 are respectively shown by the side of the first spatial multiplex transmission line 11 and the second spatial multiplex transmission line 12. As shown in FIG. 8, in the optical connection structure 1G, the first spatial multiplex transmission line 11 and the second spatial multiplex transmission line 12 are the fiber bundle (a multicore fiber). The first spatial multiplex transmission line 11 includes a plurality of first SCFs 61 each of which includes a plurality of cores 41 and a resin 62 for bundling the first SCFs 61. Each core 41 is covered by a cladding 42. The first spatial multiplex transmission line 11 has a circular cross section, and the plurality of first SCFs 61 is arranged in a hexagonally filled state. The second spatial multiplex transmission line 12 includes a plurality of second SCFs 63 each of which includes a plurality of cores 43 and a resin 64 for bundling the second SCFs 63. Each core 43 is covered by a cladding 44. The second spatial multiplex transmission line 12 has a circular cross section, and the plurality of second SCFs 63 is arranged in a hexagonally filled state. In the first lens arrangement 31 and the second lens arrangement 32, the lenses 51, 53 are arranged in the hexagonally filled state corresponding to the first spatial multiplex transmission line 11 and the second spatial multiplex transmission line 12.

In the optical connection structure 1G, the first beam diameter conversion portion 21 is a light-transmitting member connected to all the plurality of cores 41 and uniformly having a refractive index which is equal to a refractive index of each of the plurality of cores 41. The second beam diameter conversion portion 22 is a light-transmitting member connected to all the plurality of cores 43 and uniformly having a refractive index which is equal to a refractive index of each of the plurality of cores 43. The transmission optical element 2 is an isolator core which allows for passage of only light directed from the first spatial multiplex transmission line 11 to the second spatial multiplex transmission line 12. In the optical connection structure 1G, optical elements other than the transmission optical element 2 may be used.

In the optical connection structure 1G, for example, each light emitted from each core 41 at the end face 11a of the first spatial multiplex transmission line 11 passes through the first beam diameter conversion portion 21, the first lens arrangement 31, the second lens arrangement 32, and the second beam diameter conversion portion 22 to be coupled with each core 43 at the end face 12a of the second spatial multiplex transmission line 12 in the same manner as the optical connection structure 1A.

In the optical connection structure 1G, the first beam diameter conversion portion 21 and the second beam diameter conversion portion 22 are light-transmitting members having a uniform refractive index. Consequently, without the need of considering alignment with the plurality of cores 41 and the plurality of cores 43, the first beam diameter conversion portion 21 and the second beam diameter conversion portion 22 can be arranged at the first spatial multiplex transmission line 11 and the second spatial multiplex transmission line 12.

In the optical connection structure 1G, the first beam diameter conversion portion 21 is shared by the cores 41 of the plurality of first SCFs 61. In this way, according to the first beam diameter conversion portion 21 made of one member, even when the first spatial multiplex transmission line 11 is the fiber bundle made of the plurality of first SCFs 61, the plurality of first SCFs 61 can be easily accumulated. The second beam diameter conversion portion 22 is shared by the cores 43 of the plurality of second SCFs 63. In this way, according to the second beam diameter conversion portion 22 made of one member, even when the second spatial multiplex transmission line 12 is the fiber bundle made of the plurality of second SCFs 63, the plurality of second SCFs 63 can be easily integrated.

Eighth Embodiment

Figure 9:
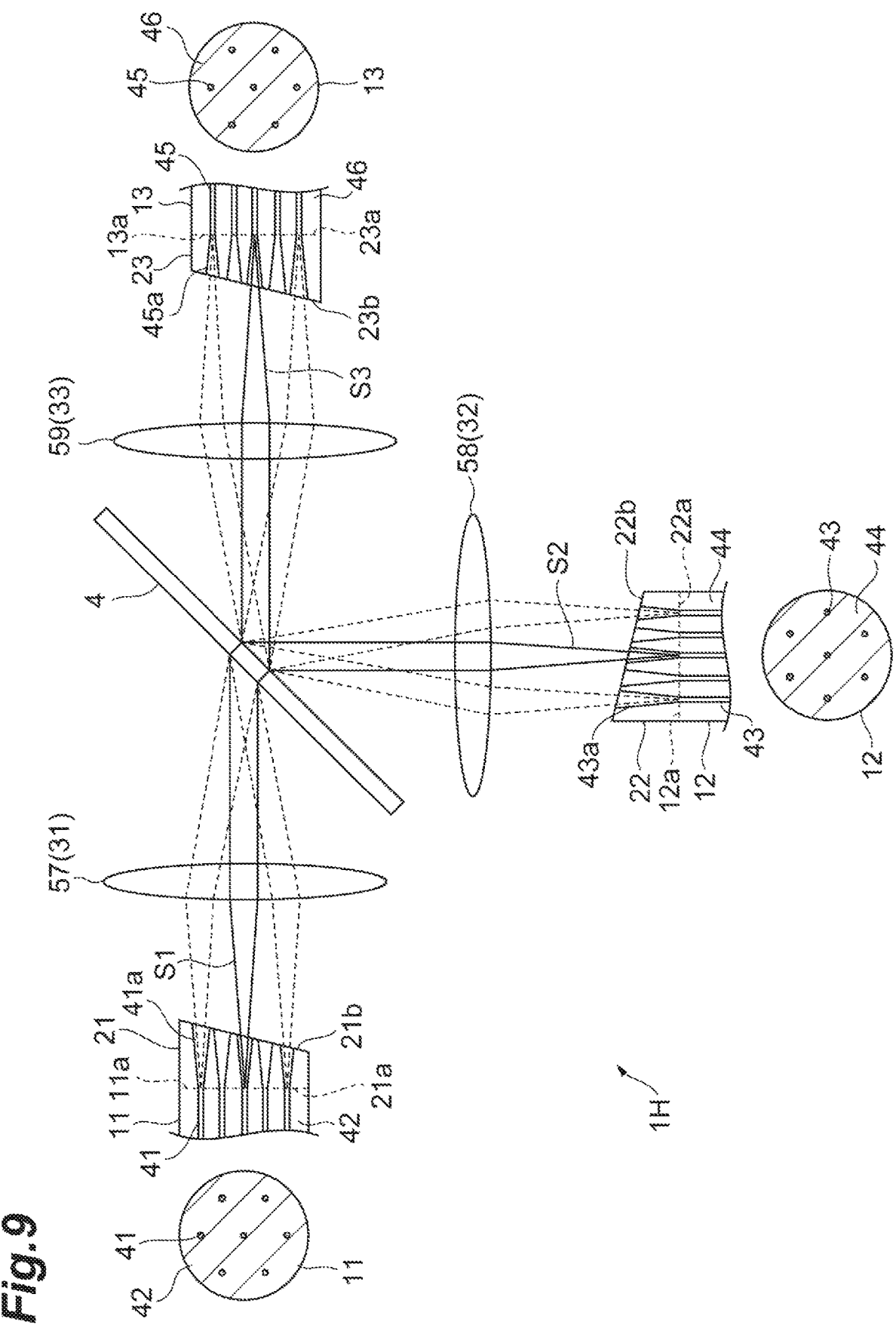
FIG. 9 illustrates an optical connection structure according to an eighth embodiment.

FIG. 9 illustrates an optical connection structure according to the eighth embodiment. An optical connection structure 1H according to the eighth embodiment is constructed based on the optical connection structure 1B and the optical connection structure 1E. In FIG. 9, cross-sectional configurations of the first spatial multiplex transmission line 11, the second spatial multiplex transmission line 12 and a third spatial multiplex transmission line 13 are respectively shown by the side of the first spatial multiplex transmission line 11 and the second spatial multiplex transmission line 12, and under the third spatial multiplex transmission line 13. The optical connection structure 1H further includes the third spatial multiplex transmission line 13, a third beam diameter conversion portion 23 and a third lens arrangement 33 which is a single lens 59. The optical connection structure 1H includes a filter 4 as an optical element having a function of a transmission optical element and a reflective optical element. The optical connection structure 1H is applied to a multicore optical amplifier. The first spatial multiplex transmission line 11 propagates signal lights Si to be amplified. The second spatial multiplex transmission line 12 propagates pump lights S2. The third spatial multiplex transmission line 13 inputs coupling lights S3 in which the signal lights Si and the pump lights S2 are coupled, and amplifies the signal lights Si by the pump lights S2. The optical connection structure 1H may include other optical elements instead of the filter 4.

In the optical connection structure 1H, the first spatial multiplex transmission line 11 is the MCF including the plurality of cores 41 as the transmission line and the cladding 42 which covers the plurality of cores 41. The plurality of cores 41 includes, for example, the center core arranged at the center of a cross section of the first spatial multiplex transmission line 11 and the plurality of outer circumferential cores surrounding the center core. The second spatial multiplex transmission line 12 is the MCF including the plurality of cores 43 as the transmission line and the cladding 44 which covers the plurality of cores 43. The plurality of cores 43 includes, for example, the center core arranged at the center of a cross section of the second spatial multiplex transmission line 12 and the plurality of outer circumferential cores surrounding the center core.

The third spatial multiplex transmission line 13 is the MCF including a plurality of cores 45 as the transmission line and a cladding 46 which covers the plurality of cores 45. The plurality of cores 45 includes, for example, the center core arranged at the center of a cross section of the third spatial multiplex transmission line 13 and the plurality of outer circumferential cores surrounding the center core. The first spatial multiplex transmission line 11, the second spatial multiplex transmission line 12 and the third spatial multiplex transmission line 13 have mutually the same shape. The third spatial multiplex transmission line 13 is an erbium-doped fiber (hereinafter, it is also abbreviated as "EDF") which contains erbium which is rare earth.

The first beam diameter conversion portion 21 is the MCF including a plurality of cores 41a connected to the plurality of cores 41. The core diameter of each of the plurality of cores 41a at the end face 21b is larger than the core diameter of each of the plurality of cores 41a at the end face 21a. The second beam diameter conversion portion 22 is the MCF including a plurality of cores 43a connected to the plurality of cores 43. The core diameter of each of the plurality of cores 43a at the end face 22b is larger than the core diameter of each of the plurality of cores 43a at the end face 22a.

The third beam diameter conversion portion 23 is a member for converting the optical diameter in the same manner as the first beam diameter conversion portion 21 and the second beam diameter conversion portion 22. The first beam diameter conversion portion 21, the second beam diameter conversion portion 22 and the third beam diameter conversion portion 23 have mutually the same shape. The third beam diameter conversion portion 23 includes an end face 23a and an end face 23b. The third beam diameter conversion portion 23 is configured such that an optical diameter at the end face 23b is larger than an optical diameter at the end face 23a. The end face 23b is inclined with respect to a surface perpendicular to a center axis of each of the plurality of cores 45, and an inclined angle thereof is 8 degrees or less, for example. The third beam diameter conversion portion 23 is the MCF including a plurality of cores 45a connected to the plurality of cores 45. The core diameter of each of the plurality of cores 45a at the end face 23b is larger than the core diameter of each of the plurality of cores 45a at the end face 23a.

In the optical connection structure 1H, the first beam diameter conversion portion 21, the second beam diameter conversion portion 22 and the third beam diameter conversion portion 23 are a TEC processing section formed by TEC processing of an end of the MCF, and a portion of the MCF excluding the TEC processing section is the first spatial multiplex transmission line 11, the second spatial multiplex transmission line 12 and the third spatial multiplex transmission line 13. TEC processing is processing of enlarging the core diameter to be tapered by applying heat to a fiber to diffuse dopant. According to the TEC processing, the MFD can be enlarged in a state that transmission loss can be inhibited to the minimum. In a case of the MCF, the core diameter can be collectively enlarged for all the cores by one TEC processing.

The filter 4 couples (multiplex) the signal lights Si output from the first spatial multiplex transmission line 11 and the pump lights S2 output from the second spatial multiplex transmission line 12 and outputs the coupling lights S3. The filter 4 functions as a transmission optical element to the signal lights Si which are lights propagating between the first spatial multiplex transmission line 11 and the third spatial multiplex transmission line 13. The filter 4 functions as a reflective optical element to the pump lights S2 which are lights propagating between the second spatial multiplex transmission line 12 and the third spatial multiplex transmission line 13.

In the optical connection structure 1H, the first beam diameter conversion portion 21 is the MCF, so that the first beam diameter conversion portion 21 and the first spatial multiplex transmission line 11 can be easily formed from one MCF by the above-described TEC processing. Also, the second beam diameter conversion portion 22 is the MCF, so that the second beam diameter conversion portion 22 and the second spatial multiplex transmission line 12 can be easily formed from one MCF by the above-described TEC processing. Moreover, the third beam diameter conversion portion 23 is the MCF, so that the third beam diameter conversion portion 23 and the third spatial multiplex transmission line 13 can be easily formed from one MCF by the above-described TEC processing.

Figure 10:
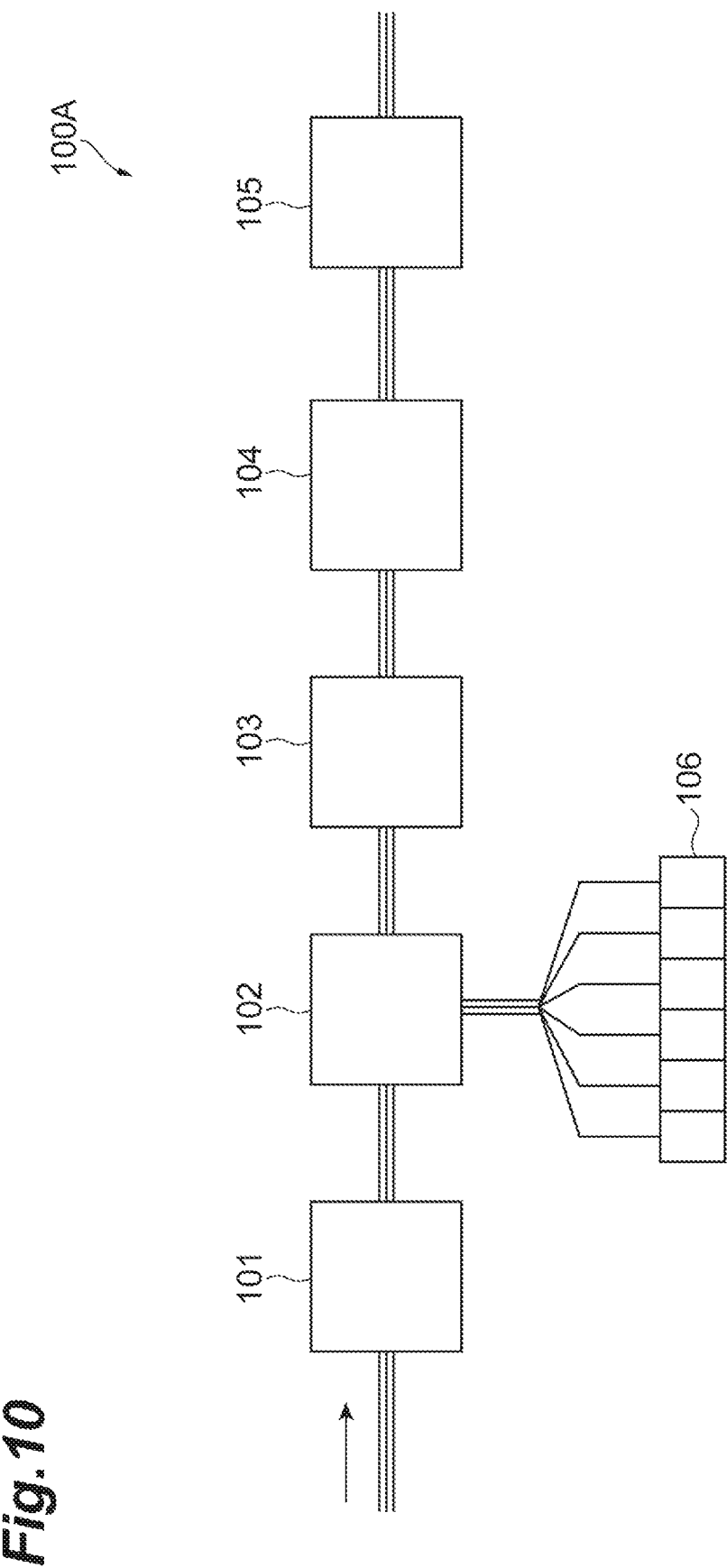
FIG. 10 illustrates one example of an optical amplification system to which the optical connection structure according to the eighth embodiment is applied.

FIG. 10 illustrates an example of an optical amplification system to which the optical connection structure according to the eighth embodiment is applied. As shown in FIG. 10, an optical amplification system 100A includes an isolator module 101, a filter module 102, an EDF 103, a gain equalization module 104, an isolator module 105 and a plurality of single mode pump light source 106. For all optical fibers of the optical amplification system 100A, the MCF or the fiber bundle is used. The optical connection structure 1H can be applied to the filter module 102.

In the optical amplification system 100A, a signal light passes through the isolator module 101 to be input to the filter module 102, and is coupled with a pump light input from the single mode pump light source 106 to the filter module 102. The coupled light is input to the EDF 103, and a signal light of each fiber core in MCF or bundle fiber is amplified. The amplified signal light passes through the gain equalization module 104 and the isolator module 105 to be output. With the isolator module 101, return light to a former stage of the optical amplification system 100A can be inhibited. With the gain equalization module 104, wavelength property of the optical amplification system 100A can be made uniform. With the isolator module 105, return light to the EDF 103 can be inhibited. The optical amplification system 100A does not necessarily include the isolator module 101 and the gain equalization module 104.

Ninth Embodiment

Figure 11:
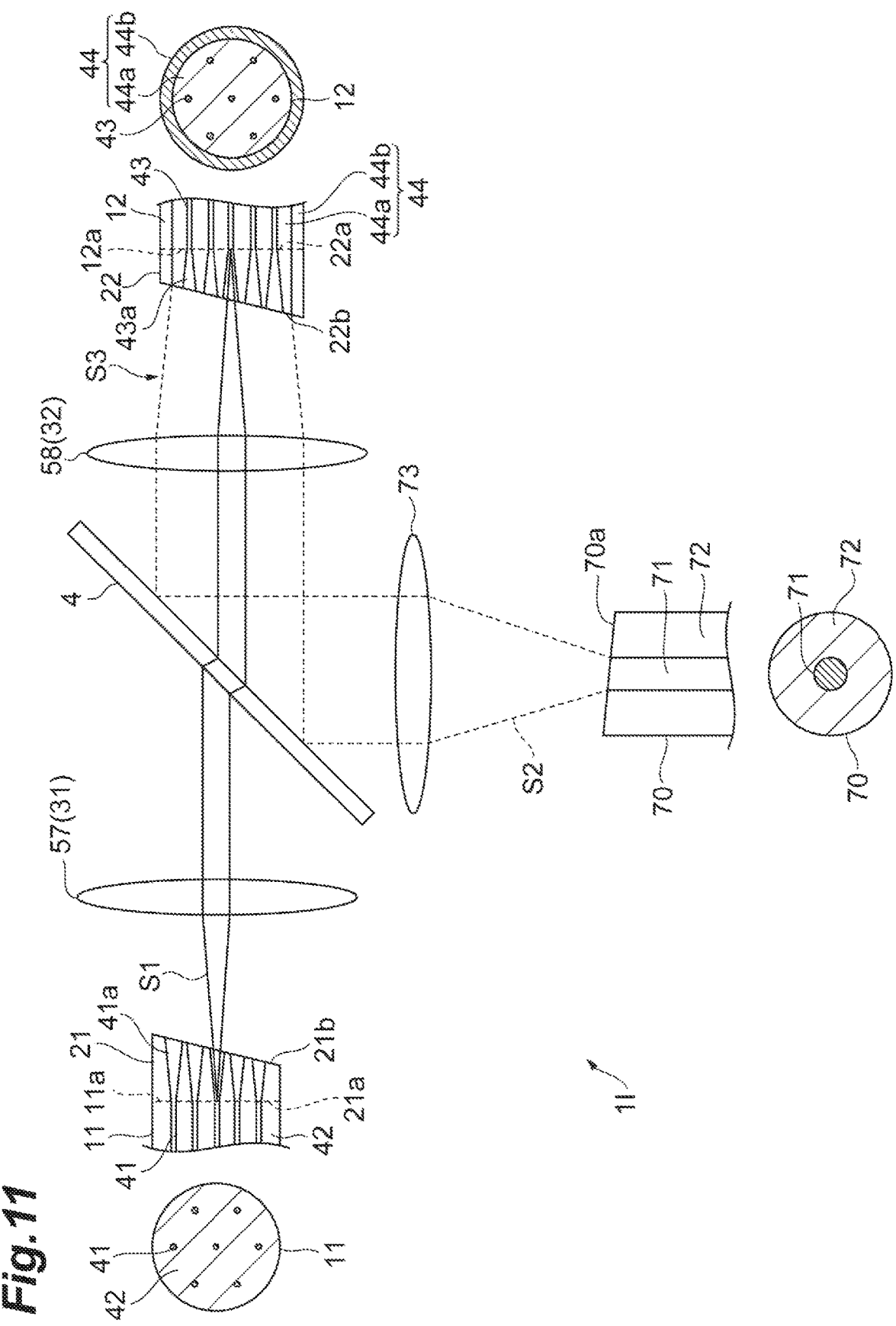
FIG. 11 illustrates an optical connection structure according to a ninth embodiment.

FIG. 11 illustrates an optical connection structure according to the ninth embodiment. An optical connection structure 1I according to the ninth embodiment 11 is constructed based on the optical connection structure 1B. In FIG. 11, cross-sectional configurations of the first spatial multiplex transmission line 11, the second spatial multiplex transmission line 12 and a multimode fiber (hereinafter, it is also abbreviated as "MMF") 70 are respectively shown by the side of the first spatial multiplex transmission line 11 and the second spatial multiplex transmission line 12, and under a MMF 70. The optical connection structure 1I further includes the MMF 70 and a single lens 73. The optical connection structure 1I includes the filter 4 as the optical element having a function of the transmission optical element 2 and the reflective optical element 3. The optical connection structure 1I is applied to a multicore optical amplifier. The first spatial multiplex transmission line 11 propagates the signal lights Si to be amplified. The MMF 70 propagates the pump light S2. The second spatial multiplex transmission line 12 inputs the coupling lights S3 in which the signal lights S1 and the pump light S2 are coupled, and amplifies the signal lights S1 by the pump light S2.

In the optical connection structure 1I, the first spatial multiplex transmission line 11 is the MCF which includes the plurality of cores 41 as the transmission line and the cladding 42 which covers the plurality of cores 41. The plurality of cores 41 include the center core arranged at the center of a cross section of the first spatial multiplex transmission line 11 and the plurality of outer circumferential cores surrounding the center core. The second spatial multiplex transmission line 12 is the MCF which includes the plurality of cores 43 as the transmission line and the cladding 44 which covers the plurality of cores 43. The plurality of cores 43 include, for example, the center core arranged at the center of a cross section of the second spatial multiplex transmission line 12 and the plurality of outer circumferential cores surrounding the center core. The cladding 44 has a double-cladding structure and includes an inner cladding 44a which covers the plurality of cores 43 and an outer cladding 44b which covers the inner cladding 44a. The second spatial multiplex transmission line 12 is the EDF.

The MMF 70 includes a core 71 as the transmission line and a cladding 72 which covers the core 71. An end face 70a of the MMF 70 is obliquely polished.

The first beam diameter conversion portion 21 is the MCF including the plurality of cores 41a connected to the plurality of cores 41. The core diameter of each of the plurality of cores 41a at the end face 21b is larger than the core diameter of each of the plurality of cores 41a at the end face 21a. The second beam diameter conversion portion 22 is the MCF including the plurality of cores 43a connected to the plurality of cores 43. The core diameter of each of the plurality of cores 43a at the end face 22b is larger than the core diameter of each of the plurality of cores 43a at the end face 22a.

In the optical connection structure 1I, the first beam diameter conversion portion 21 and the second beam diameter conversion portion 22 are a TEC processing section formed by TEC processing of an end of the MCF, and a portion of the MCF excluding the TEC processing section is the first spatial multiplex transmission line 11 and the second spatial multiplex transmission line 12.

The lens 73 is arranged at a position where the pump light S2 input from the MMF 70 becomes a parallel light. The lens 73 makes the pump light S2 input from the MMF 70 a parallel light to output it to the filter 4. The second lens arrangement 32 inputs the pump light S2 as a parallel light from the filter 4 and outputs the pump light S2 to the second spatial multiplex transmission line 12. The lens 73 and the second lens arrangement 32 are arranged at a position where the entire inner cladding 44a of the second spatial multiplex transmission line 12 is irradiated with the pump light S2.

The filter 4 couples (multiplexes) the signal lights S1 output from the first spatial multiplex transmission line 11 and the pump light S2 output from the MMF 70 and outputs the coupling lights S3. The filter 4 functions as the reflective optical element to the pump light S2 which is light propagating between the second spatial multiplex transmission line 12 and the MMF 70. The filter 4 functions as the transmission optical element to the signal lights Si which are lights propagating between the first spatial multiplex transmission line 11 and the second spatial multiplex transmission line 12.

In the optical connection structure 1I, all the signal lights S1 can be irradiated with the pump light S2 by one pump light source adapted to the MMF 70. Accordingly, amplification with a high excitation power can be executed using an inexpensive configuration.

Figure 12:
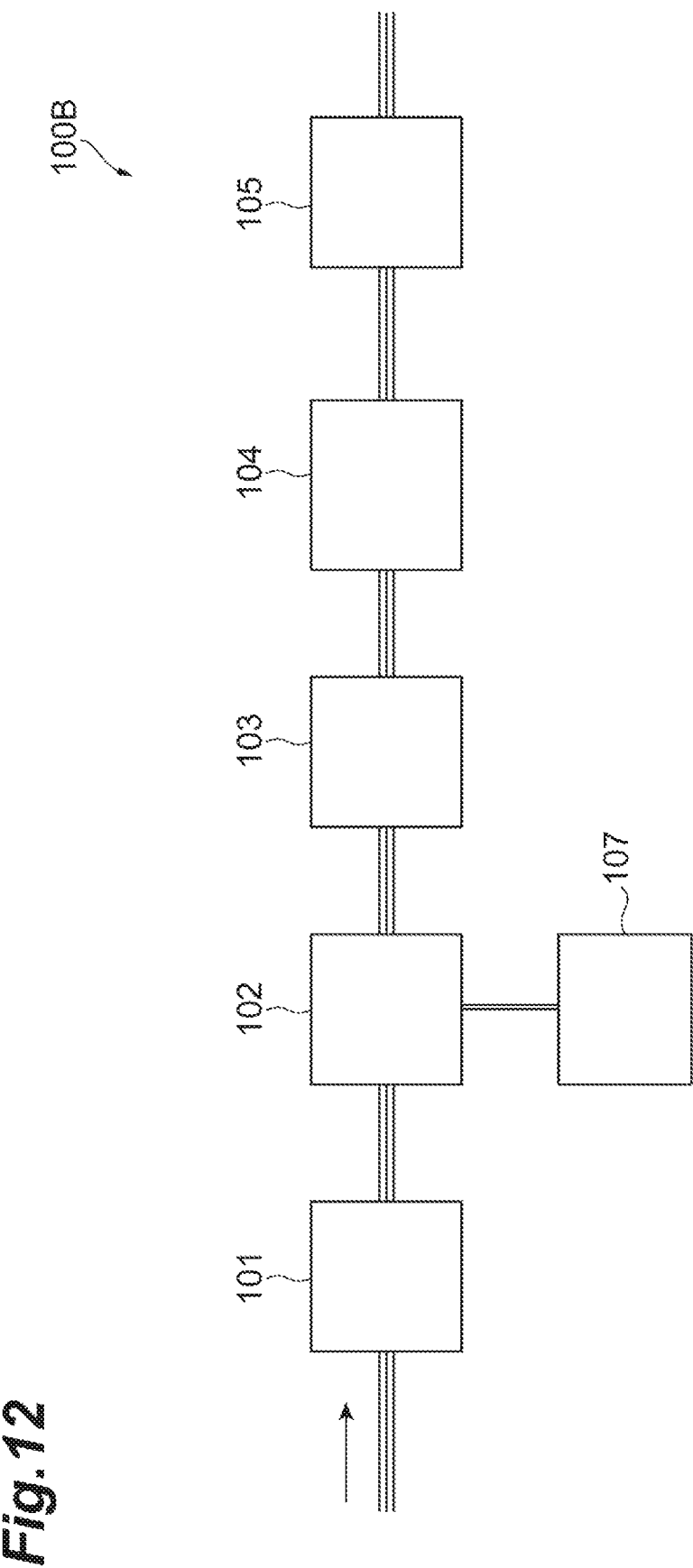
FIG. 12 illustrates one example of an optical amplification system to which the optical connection structure according to the ninth embodiment is applied.

FIG. 12 illustrates an example of an optical amplification system to which the optical connection structure according to the ninth embodiment is applied. As shown in FIG. 12, an optical amplification system 100B includes the isolator module 101, the filter module 102, the EDF 103, the gain equalization module 104, the isolator module 105 and a multimode pump light source 107. In the optical amplification system 100B, for example, the MCF is used for all the optical fibers excluding one in the multimode pump light source 107 for which the MMF is used. The MCF excluding one between the filter module 102 and the EDF 103 may be the fiber bundle.

In the optical amplification system 100B, a signal light passes through the isolator module 101 to be input to the filter module 102, and is coupled with a pump light input from the multimode pump light source 107 to the filter module 102. The coupled light is input to the EDF 103, and a signal light of each core or each center core is amplified. The amplified signal light passes through the gain equalization module 104 and the isolator module 105 to be output. With the isolator module 101, return light to a former stage of the optical amplification system 100B can be inhibited. With the gain equalization module 104, wavelength property of the optical amplification system 100B can be made uniform. With the isolator module 105, return light to the EDF 103 can be inhibited. The optical amplification system 100B does not necessarily include the isolator module 101 and the gain equalization module 104.

Tenth Embodiment

Figure 13:
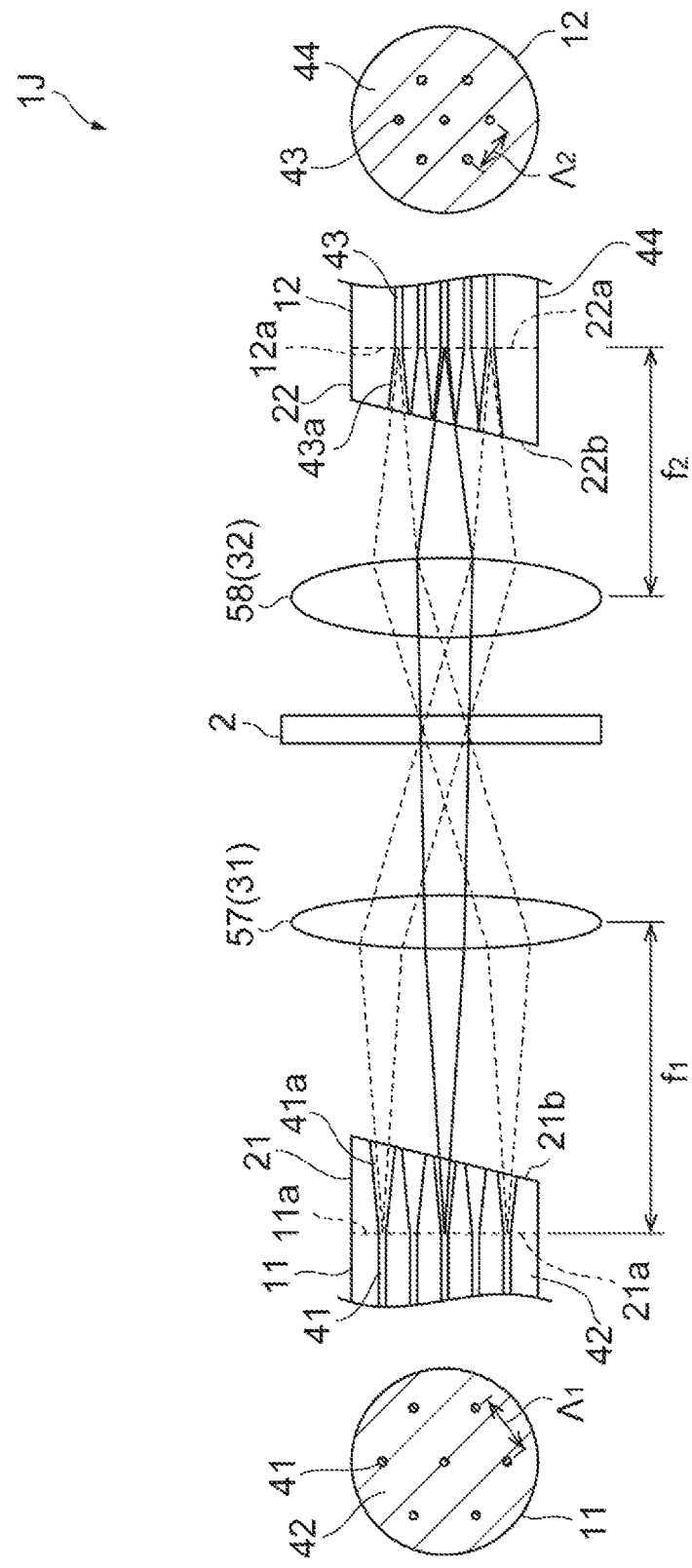
FIG. 13 illustrates an optical connection structure according to a tenth embodiment.

FIG. 13 illustrates an optical connection structure according to the tenth embodiment. An optical connection structure 1J according to the tenth embodiment is constructed based on the optical connection structure 1B. In the optical connection structure 1J, connection of MFCs having different core pitches can be achieved. In FIG. 13, cross-sectional configurations of the first spatial multiplex transmission line 11 and the second spatial multiplex transmission line 12 are respectively shown by the side of the first spatial multiplex transmission line 11 and the second spatial multiplex transmission line 12.

As shown in FIG. 13, in the optical connection structure 1J, the first spatial multiplex transmission line 11 is the MCF which includes the plurality of cores 41 as the transmission line and the cladding 42 which covers the plurality of cores 41. The plurality of cores 41 includes, for example, the center core arranged at the center of a cross section of the first spatial multiplex transmission line 11 and the plurality of outer circumferential cores surrounding the center core. The second spatial multiplex transmission line 12 is the MCF which includes the plurality of cores 43 as the transmission line and the cladding 44 which covers the plurality of cores 43. The plurality of cores 43 includes, for example, the center core arranged at the center of a cross section of the second spatial multiplex transmission line 12 and the plurality of outer circumferential cores surrounding the center core.

In the optical connection structure 1J, the first beam diameter conversion portion 21 and the second beam diameter conversion portion 22 are the TEC processing section formed by TEC processing of the end of the MCF, and a portion of the MCF excluding the TEC processing section is the first spatial multiplex transmission line 11 and the second spatial multiplex transmission line 12.

A core pitch $\Lambda_1$ of the plurality of cores 41 and a core pitch $\Lambda_2$ of the plurality of cores 43 are mutually different. The core pitch $\Lambda_1$ is larger than the core pitch $\Lambda_2$. The core pitch $\Lambda_1$ is the distance between the center points of a pair of adjacent cores 41. The core pitch $\Lambda_2$ is the distance between the center points of a pair of adjacent cores 43. A focal length $f_1$ of the lens 57 and a focal length $f_2$ of the lens 58 are mutually different. The focal length $f_1$ of the lens 57 is longer than the focal length $f_2$ of the lens 58. A mode field diameter $d_1$ (not shown) of the first beam diameter conversion portion 21 at the end face 21a and a mode field diameter $d_2$ (not shown) of the second beam diameter conversion portion 22 at the end face 22a are mutually different. The mode field diameter $d_1$ is larger than the mode field diameter $d_2$.

A ratio of the focal length $f_1$ to the focal length $f_2$ and a ratio of the mode field diameter $d_1$ to the mode field diameter $d_2$ are equal to a ratio of the core pitch $\Lambda_1$ to the core pitch $\Lambda_2$, which satisfies the formula (2). Accordingly, the first spatial multiplex transmission line 11 and the second spatial multiplex transmission line 12 can be connected while coupling loss is inhibited.

[Equation 2]

$$\frac{\Lambda_1}{\Lambda_2} = \frac{d_1}{d_2} = \frac{f_1}{f_2} \quad (2)$$

Eleventh Embodiment

Figure 14:
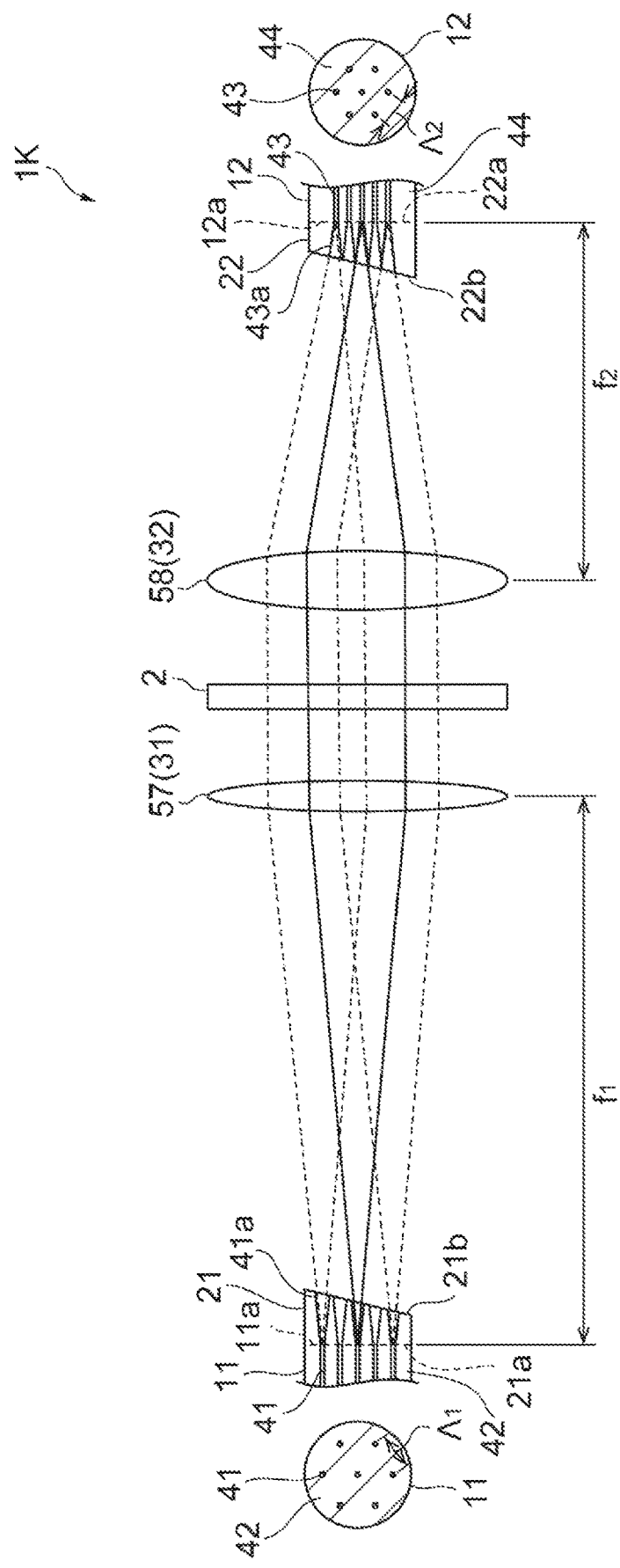
FIG. 14 illustrates an optical connection structure according to an eleventh embodiment.

FIG. 14 illustrates an optical connection structure according to the eleventh embodiment. An optical connection structure 1K according to the eleventh embodiment is constructed based on the optical connection structure 1C. In the optical connection structure 1K, connection of MFCs having different core pitches can be achieved in the same manner as the optical connection structure 1J. In FIG. 14, cross-sectional configurations of the first spatial multiplex transmission line 11 and the second spatial multiplex transmission line 12 are respectively shown by the side of the first spatial multiplex transmission line 11 and the second spatial multiplex transmission line 12.

The first spatial multiplex transmission line 11, the second spatial multiplex transmission line 12, the first beam diameter conversion portion 21 and the second beam diameter conversion portion 22 of the optical connection structure 1K shown in FIG. 14 have mutually the same configuration as in the first spatial multiplex transmission line 11, the second spatial multiplex transmission line 12, the first beam diameter conversion portion 21 and the second beam diameter conversion portion 22 of the optical connection structure 1J shown in FIG. 13. Also in the optical connection structure 1K, a ratio of the focal length $f_1$ to the focal length $f_2$ and a ratio of the mode field diameter $d_1$ to the mode field diameter $d_2$ are equal to a ratio of the core pitch $\Lambda_1$ to the core pitch $\Lambda_2$, which satisfies the formula (2). Accordingly, the first spatial multiplex transmission line 11 and the second spatial multiplex transmission line 12 can be connected while coupling loss is inhibited.

Twelfth Embodiment

Figure 15:
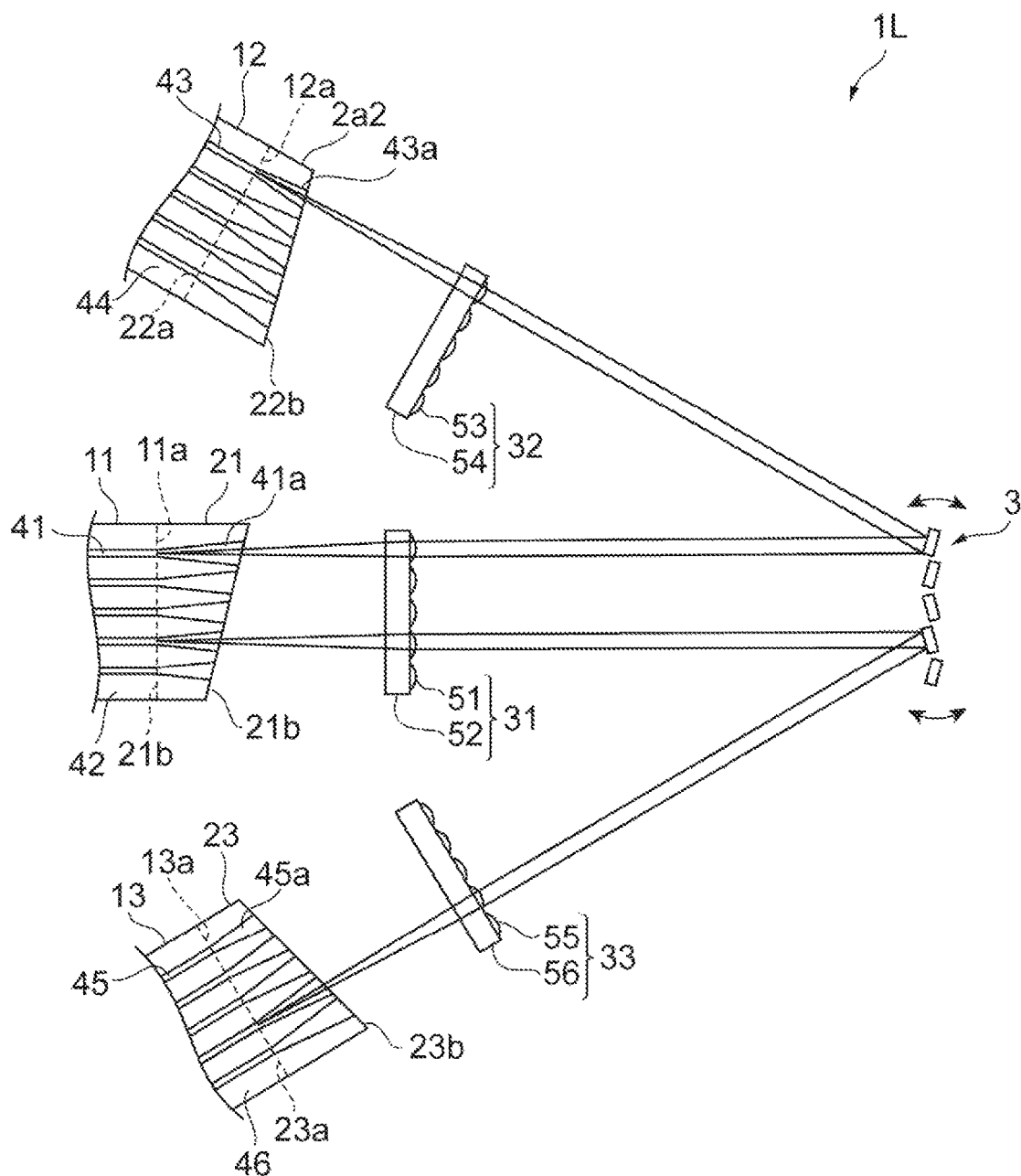
FIG. 15 illustrates an optical connection structure according to a twelfth embodiment.

FIG. 15 illustrates an optical connection structure according to the twelfth embodiment. An optical connection structure 1L according to the twelfth embodiment is constructed based on the optical connection structure 1D (see FIG. 5). In the optical connection structure 1L, batch switching of a plurality of transmission lines by a MEMS mirror can be achieved. Here, an example which uses three input/output ports is explained. However, four or more input/output ports may be used.

As shown in FIG. 15, in the optical connection structure 1L, the reflective optical element 3 is the MEMS mirror array (the movable mirror). The optical connection structure 1L further includes the third spatial multiplex transmission line 13, the third beam diameter conversion portion 23 and the third lens arrangement 33 in the same manner as the optical connection structure 1H (see FIG. 9). In the optical connection structure 1L, the first lens arrangement 31 is a lens array including the plurality of lenses 51 and the retention portion 52 to hold the plurality of lenses 51. The second lens arrangement 32 is a lens array including the plurality of lenses 53 and the retention portion 54 to hold the plurality of lenses 53. The third lens arrangement 33 is a lens array including a plurality of lenses 55 and a retention portion 56 to hold the plurality of lenses 55. The first lens arrangement 31, the second lens arrangement 32 and the third lens arrangement 33 mutually have the same configuration. The first spatial multiplex transmission line 11, the second spatial multiplex transmission line 12, the third spatial multiplex transmission line 13, the first beam diameter conversion portion 21, the second beam diameter conversion portion 22 and the third beam diameter conversion portion 23 mutually have the same configuration in the optical connection structure 1L and the optical connection structure 1H.

The reflective optical element 3 has a plurality of mirrors, and each mirror allows for optical coupling of two lens arrangements of the first lens arrangement 31, the second lens arrangement 32 and the third lens arrangement 33. Here, each mirror allows for optical coupling of the first lens arrangement 31 and the second lens arrangement 32 or the third lens arrangement 33. Each mirror is arranged to face each core 41 of the first spatial multiplex transmission line 11, and allows for coupling of light from each core 41 to the corresponding core 43 of the second spatial multiplex transmission line 12 or the corresponding core 45 of the third spatial multiplex transmission line 13 in accordance with the orientation of each mirror. The first lens arrangement 31, the second lens arrangement 32 and the third lens arrangement 33 are the lens array, so that they can individually switch the light from each core 41 by each mirror of the reflective optical element 3.

Thirteenth Embodiment

Figure 16:
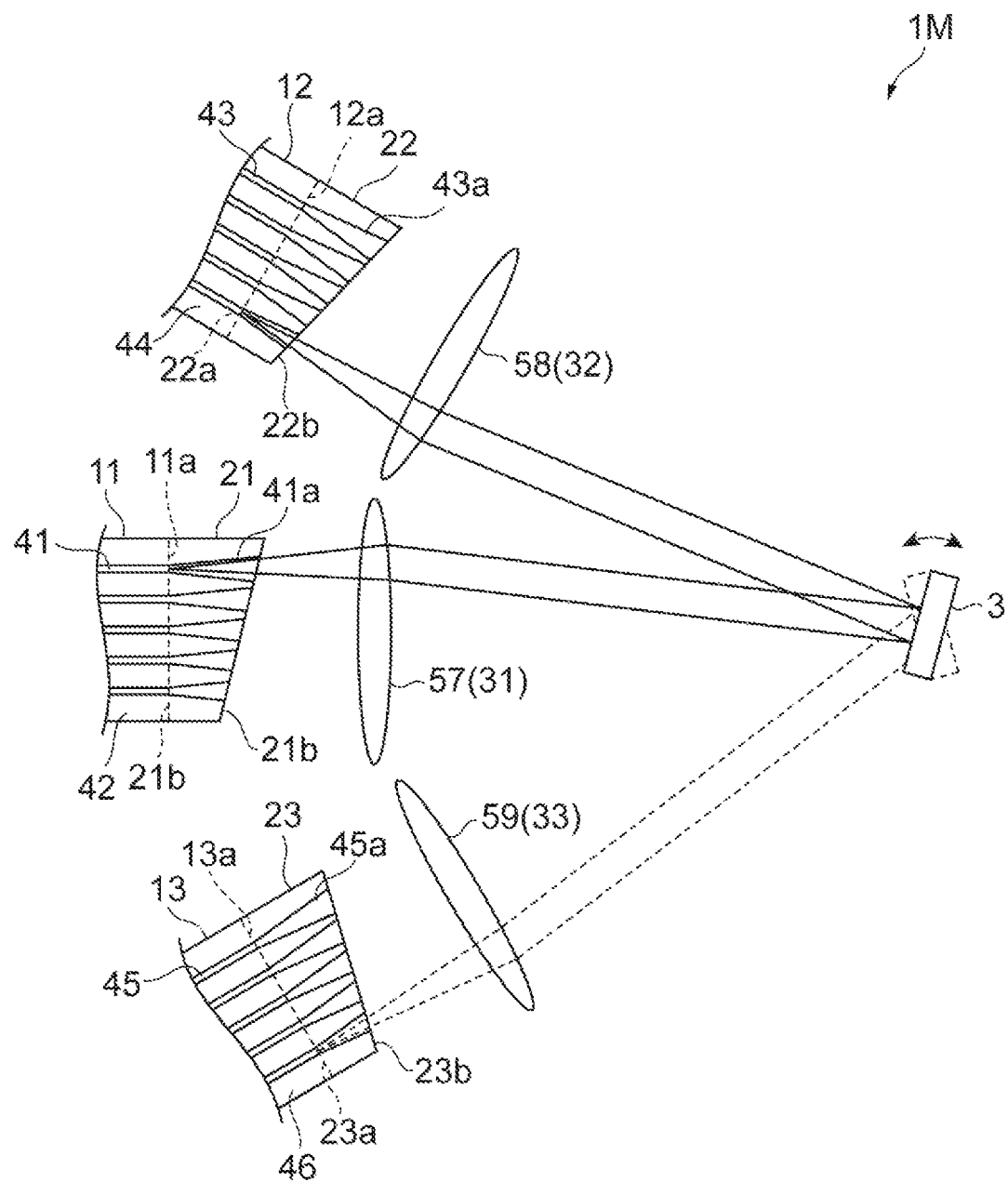
FIG. 16 illustrates an optical connection structure according to a thirteenth embodiment.

FIG. 16 illustrates an optical connection structure according to the thirteenth embodiment. An optical connection structure 1M according to the thirteenth embodiment is constructed based on the optical connection structure 1D (see FIG. 5). Also in the optical connection structure 1M, batch switching of a plurality of transmission lines by the MEMS mirror can be achieved in the same manner as the optical connection structure 1L. Here, an example which uses three input/output ports is explained. However, four or more input/output ports may be used.

As shown in FIG. 16, in the optical connection structure 1M, the reflective optical element 3 is the MEMS mirror (the movable mirror). The first spatial multiplex transmission line 11, the second spatial multiplex transmission line 12, the third spatial multiplex transmission line 13, the first beam diameter conversion portion 21, the second beam diameter conversion portion 22, the third beam diameter conversion portion 23, the first lens arrangement 31, the second lens arrangement 32 and the third lens arrangement 33 mutually have the same configuration in the optical connection structure 1M and the optical connection structure 1H (see FIG. 9).

The reflective optical element 3 has a single mirror. The mirror allows for optical coupling of two lens arrangements of the first lens arrangement 31, the second lens arrangement 32 and the third lens arrangement 33. The mirror of the reflective optical element 3 is arranged to face the first spatial multiplex transmission line 11, and allows for coupling of all rays of light from the plurality of cores 41 to the second spatial multiplex transmission line 12 or the third spatial multiplex transmission line 13. The first lens arrangement 31, the second lens arrangement 32 and the third lens arrangement 33 are the single lenses 57, 58, 59, so that batch switching of all rays of light can be executed even when the reflective optical element 3 is the MEMS mirror which is relatively small.

The present invention is not limited to above embodiments, and various modifications can be made. For example, the optical connection structure according to each embodiment described above does not necessarily include the second beam diameter conversion portion 22. The first spatial multiplex transmission line 11 and the second spatial multiplex transmission line 12 may be an array of a planar waveguide having a plurality of waveguides as the transmission line.

What is claimed is:

1. An optical connection structure comprising:
a first spatial multiplex transmission line having a plurality of first transmission lines;
a second spatial multiplex transmission line having a plurality of second transmission lines;
a first lens arrangement optically coupled with the first spatial multiplex transmission line;
a second lens arrangement optically coupled with the second spatial multiplex transmission line; and
a first beam diameter conversion portion having a first end face and a second end face and arranged between the first spatial multiplex transmission line and the first lens arrangement,
wherein the first lens arrangement and the second lens arrangement are mutually optically coupled to propagate parallel lights between the first lens arrangement and the second lens arrangement,
the first end face is in contact with the first spatial multiplex transmission line,
the second end face is inclined with respect to a surface perpendicular to a center axis of each of the plurality of first transmission lines, and
the first beam diameter conversion portion is configured such that an optical diameter at the second end face is larger than an optical diameter at the first end face.

2. The optical connection structure according to claim 1, further comprising a second beam diameter conversion portion having a third end face and a fourth end face and arranged between the second spatial multiplex transmission line and the second lens arrangement, wherein
the third end face is in contact with the second spatial multiplex transmission line,
the fourth end face is inclined with respect to a surface perpendicular to a center axis of each of the plurality of second transmission lines, and
the second beam diameter conversion portion is configured such that an optical diameter at the fourth end face is larger than an optical diameter at the third end face.

3. The optical connection structure according to claim 1, wherein, an anti-reflection coating is provided on the second end face to inhibit reflection of light propagating in the plurality of first transmission lines and the plurality of second transmission lines.

4. The optical connection structure according to claim 1, wherein the first spatial multiplex transmission line is a fiber bundle including a plurality of first single core fibers and a resin,
each of the plurality of first single core fibers includes a single first core as the first transmission line, and
the resin bundles the plurality of first single core fibers.

5. The optical connection structure according to claim 4, wherein the first beam diameter conversion portion is a light-transmitting member connected to the first core and uniformly having a refractive index which is equal to a refractive index of the first core.

6. The optical connection structure according to claim 1, wherein the first spatial multiplex transmission line is a multicore fiber including a plurality of first cores as the plurality of first transmission lines.

7. The optical connection structure according to claim 6, wherein the first beam diameter conversion portion is a multicore fiber including a plurality of second cores connected to the plurality of first cores, and
a core diameter of each of the plurality of second cores at the second end face is larger than a core diameter of each of the plurality of second cores at the first end face.

8. The optical connection structure according to claim 6, wherein the first beam diameter conversion portion is a light-transmitting member connected to the plurality of first cores and uniformly having a refractive index which is equal to a refractive index of each of the plurality of first cores.

9. The optical connection structure according to claim 6, wherein the first lens arrangement and the second lens arrangement are a single lens,
the first lens arrangement is arranged such that a focal point of the first lens arrangement is positioned at an end face of the first spatial multiplex transmission line,
the second lens arrangement is arranged such that a focal point of the second lens arrangement is positioned at an end face of the second spatial multiplex transmission line, and
a plurality of parallel rays of light propagates in a mutually parallel state between the first lens arrangement and the second lens arrangement.

10. The optical connection structure according to claim 6, wherein the first lens arrangement and the second lens arrangement are a single lens and arranged such that a focal point of the first lens arrangement and a focal point of the second lens arrangement mutually overlap,
the first lens arrangement is arranged such that the focal point of the first lens arrangement is positioned at an end face of the first spatial multiplex transmission line,
the second lens arrangement is arranged such that the focal point of the second lens arrangement is positioned at an end face of the second spatial multiplex transmission line, and
a plurality of parallel rays of light propagates in a mutually crossed state between the first lens arrangement and the second lens arrangement.

11. The optical connection structure according to claim 9, further comprising a second beam diameter conversion portion having a third end face and a fourth end face and arranged between the second spatial multiplex transmission line and the second lens arrangement, wherein
the third end face is in contact with the second spatial multiplex transmission line,
the fourth end face is inclined with respect to a surface perpendicular to a center axis of each of the plurality of second transmission lines,
the second beam diameter conversion portion is configured such that an optical diameter at the fourth end face is larger than an optical diameter at the third end face,
the second spatial multiplex transmission line is a multi-core fiber including a plurality of third cores as the plurality of second transmission lines, and
a ratio of a mode field diameter at the first end face of the first beam diameter conversion portion to a mode field diameter at the third end face of the second beam diameter conversion portion and a ratio of a focal length of the first lens arrangement to a focal length of the second lens arrangement are equal to a ratio of a core pitch of the plurality of first cores and to a core pitch of the plurality of third cores.

12. The optical connection structure according to claim 10, further comprising a second beam diameter conversion portion having a third end face and a fourth end face and arranged between the second spatial multiplex transmission line and the second lens arrangement, wherein the third end face is in contact with the second spatial multiplex transmission line, the fourth end face is inclined with respect to a surface perpendicular to a center axis of each of the plurality of second transmission lines, the second beam diameter conversion portion is configured such that an optical diameter at the fourth end face is larger than an optical diameter at the third end face, the second spatial multiplex transmission line is a multi-core fiber including a plurality of third cores as the plurality of second transmission lines, and a ratio of a mode field diameter at the first end face of the first beam diameter conversion portion to a mode field diameter at the third end face of the second beam diameter conversion portion and a ratio of a focal length of the first lens arrangement to a focal length of the second lens arrangement are equal to a ratio of a core pitch of the plurality of first cores and to a core pitch of the plurality of third cores.

13. The optical connection structure according to claim 6, wherein the first lens arrangement is a lens array having a plurality of lenses respectively corresponding to the plurality of first cores.

14. The optical connection structure according to claim 1, further comprising an isolator core optically coupled with the first lens arrangement and the second lens arrangement to pass light only in one direction.

15. The optical connection structure according to claim 1, further comprising a filter optically connected to the first lens arrangement and the second lens arrangement and capable of multiplexing or demultiplexing lights with different wavelengths.

16. The optical connection structure according to claim 15, wherein the filter couples a pump light with a signal light output from the first lens arrangement and inputs the pump light and the signal light into the second lens arrangement, the second spatial multiplex transmission line contains rare earth, and the second spatial multiplex transmission line amplifies the signal light input from the second lens arrangement by the pump light input from the second lens arrangement.

17. The optical connection structure according to claim 1, further comprising a movable mirror to optically couple two lens arrangements of three or more lens arrangements including the first lens arrangement and the second lens arrangement.

18. The optical connection structure according to claim 1, wherein an optical diameter of the first transmission line is 6 µm or less.

19. The optical connection structure according to claim 18, wherein an optical diameter at the second end face is 8 µm or more.

* * * * *